(12) United States Patent
Sakemi

(10) Patent No.: US 10,579,314 B2
(45) Date of Patent: Mar. 3, 2020

(54) PRINTING APPARATUS, USABLE AMOUNT MANAGING SYSTEM, USABLE AMOUNT MANAGING METHOD, AND NON-TRANSITORY RECORDING MEDIUM

(71) Applicant: Satoshi Sakemi, Kanagawa (JP)

(72) Inventor: Satoshi Sakemi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/240,874

(22) Filed: Jan. 7, 2019

(65) Prior Publication Data
US 2019/0265925 A1 Aug. 29, 2019

(30) Foreign Application Priority Data
Feb. 26, 2018 (JP) .................................. 2018-031963

(51) Int. Cl.
*G06F 3/12* (2006.01)
*G06F 21/31* (2013.01)

(52) U.S. Cl.
CPC .......... *G06F 3/1239* (2013.01); *G06F 3/1203* (2013.01); *G06F 3/1288* (2013.01); *G06F 21/31* (2013.01)

(58) Field of Classification Search
CPC .... G06F 3/1239; G06F 3/1203; G06F 3/1288; G06F 21/31
(Continued)

(56) References Cited

U.S. PATENT DOCUMENTS

2015/0055172 A1* 2/2015 Iida .................... G06K 15/4065
358/1.15
2016/0154611 A1* 6/2016 Sato ..................... G06F 3/1204
358/1.15
(Continued)

FOREIGN PATENT DOCUMENTS

JP      11-024517      1/1999
JP      2004-343416    12/2004
(Continued)

OTHER PUBLICATIONS

U.S. Appl. No. 15/973,949, filed May 8, 2018, Satoshi Sakemi.

*Primary Examiner* — Tammy Paige Goddard
*Assistant Examiner* — Darryl V Dottin
(74) *Attorney, Agent, or Firm* — Oblon, McClelland, Maier & Neustadt, L.L.P.

(57) ABSTRACT

A printing apparatus includes one or more processors and a memory that stores a plurality of instructions which, when executed by one or more processors, cause the processors to: transmit user identification information identifying a user to a usable amount management server that manages a usable amount for each attribute to which a user belongs; in response to transmission of the user identification information, receive attribute identification information corresponding to the user identification information; and when the user belongs to a plurality of attributes, control a display to display a screen according to the received attribute identification information to receive setting of a consumption ratio. The usable amount is reduced by printing. The attribute identification information identifies the attribute to which the user belongs. The consumption ratio represents a ratio of a consumption amount of each of the attributes to a consumption amount consumed by printing by the user.

10 Claims, 29 Drawing Sheets

(58) Field of Classification Search
USPC .......................................................... 358/1.15
See application file for complete search history.

(56) References Cited

U.S. PATENT DOCUMENTS

2016/0216923 A1\* 7/2016 Willamowski ........ G06F 3/1219
2018/0247048 A1   8/2018 Sakemi

FOREIGN PATENT DOCUMENTS

| JP | 2013-120429 | 6/2013 |
| JP | 2015-039192 | 2/2015 |
| JP | 2018-142226 | 9/2018 |

\* cited by examiner

| USER ID | CONSUMPTION RATIO |
|---------|-------------------|
| USER A | GROUP G1=1 |
| USER B | GROUP G1=1 |
| USER C | GROUP G1=1, GROUP G2=0 |
| USER D | GROUP G2=1 |
| USER E | GROUP G3=1 |
| ... | ... |

| GROUP ID | USABLE AMOUNT |
|----------|---------------|
| GROUP G1 | 150 |
| GROUP G2 | 200 |
| GROUP G3 | 100 |
| ... | ... |

FIG. 5F

| USER ID | CONSUMPTION AMOUNT PARAMETER |
|---|---|
| USER A | MONOCHROME SIMPLEX PRINTING=2, MONOCHROME DUPLEX PRINTING=3, COLOR SIMPLEX PRINTING=6, COLOR DUPLEX PRINTING=9 |
| USER B | MONOCHROME SIMPLEX PRINTING=2, MONOCHROME DUPLEX PRINTING=3, COLOR SIMPLEX PRINTING=6, COLOR DUPLEX PRINTING=9 |
| USER C | MONOCHROME SIMPLEX PRINTING=2, MONOCHROME DUPLEX PRINTING=3, COLOR SIMPLEX PRINTING=6, COLOR DUPLEX PRINTING=9 |
| USER D | MONOCHROME SIMPLEX PRINTING=3, MONOCHROME DUPLEX PRINTING=4, COLOR SIMPLEX PRINTING=9, COLOR DUPLEX PRINTING=12 |
| USER E | MONOCHROME SIMPLEX PRINTING=3, MONOCHROME DUPLEX PRINTING=4, COLOR SIMPLEX PRINTING=9, COLOR DUPLEX PRINTING=12 |
| ... | ... |

T6

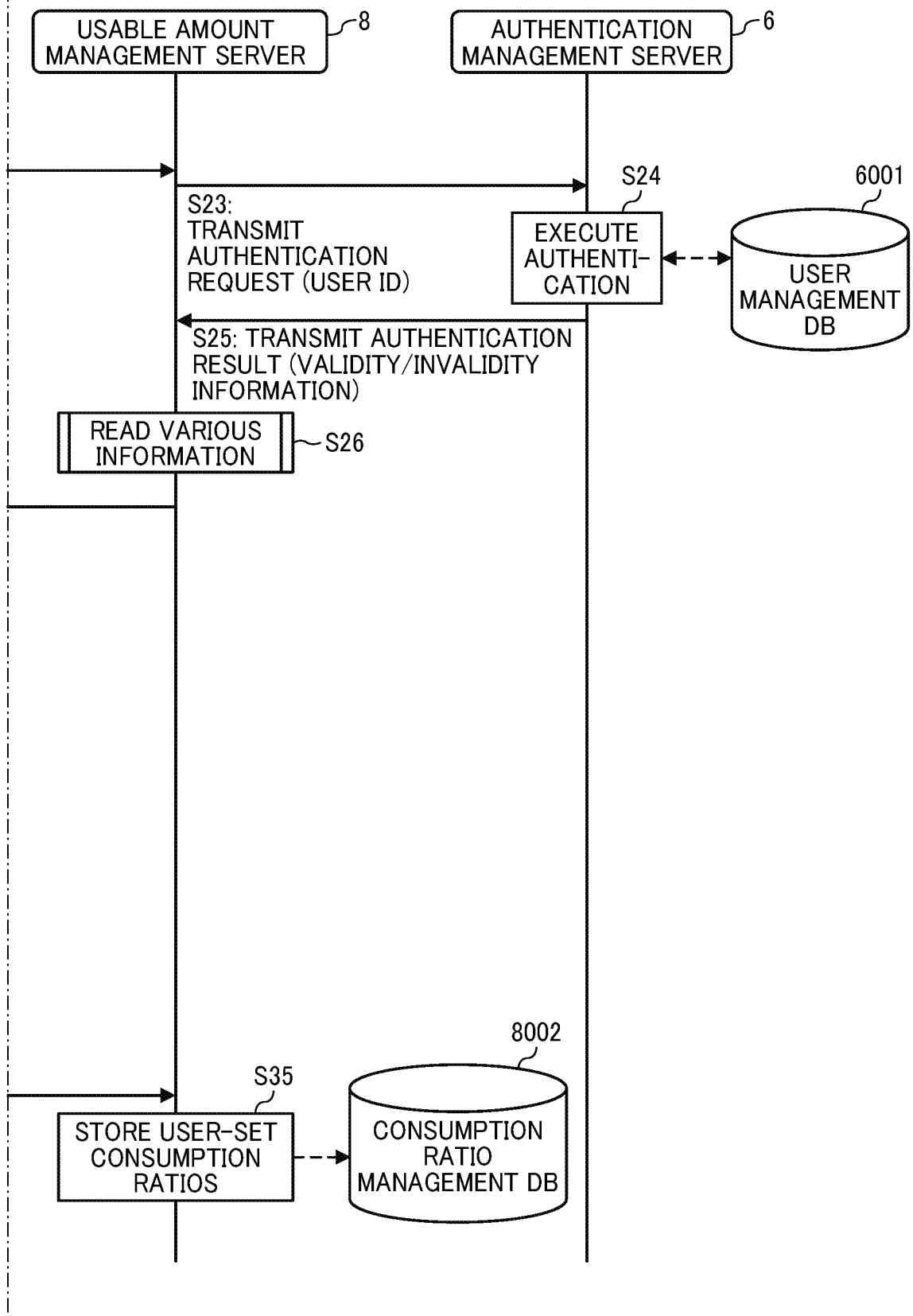

| USER ID | CONSUMPTION RATIO ID | CONSUMPTION RATIO |
|---------|---------------------|-------------------|
| USER A | RATIO R1 | GROUP G1=1 |
| USER B | RATIO R2 | GROUP G1=1 |
| USER C | RATIO R3-1 | GROUP G1=1, GROUP G2=0 |
| USER C | RATIO R3-2 | GROUP G1=0.6, GROUP G2=0.4 |
| USER D | RATIO R4 | GROUP G2=1 |
| USER E | RATIO R5 | GROUP G3=1 |
| ... | ... | ... |

| GROUP ID | USABLE AMOUNT |
|---|---|
| GROUP G1 | 150 |
| GROUP G2 | 200 |
| GROUP G3 | 100 |
| ... | ... |

| USER ID | CONSUMPTION AMOUNT PARAMETER |
|---|---|
| USER A | MONOCHROME SIMPLEX PRINTING=2, MONOCHROME DUPLEX PRINTING=3, COLOR SIMPLEX PRINTING=6, COLOR DUPLEX PRINTING=9 |
| USER B | MONOCHROME SIMPLEX PRINTING=2, MONOCHROME DUPLEX PRINTING=3, COLOR SIMPLEX PRINTING=6, COLOR DUPLEX PRINTING=9 |
| USER C | MONOCHROME SIMPLEX PRINTING=2, MONOCHROME DUPLEX PRINTING=3, COLOR SIMPLEX PRINTING=6, COLOR DUPLEX PRINTING=9 |
| USER D | MONOCHROME SIMPLEX PRINTING=3, MONOCHROME DUPLEX PRINTING=4, COLOR SIMPLEX PRINTING=9, COLOR DUPLEX PRINTING=12 |
| USER E | MONOCHROME SIMPLEX PRINTING=3, MONOCHROME DUPLEX PRINTING=4, COLOR SIMPLEX PRINTING=9, COLOR DUPLEX PRINTING=12 |
| ... | ... |

T6

PRINTING APPARATUS, USABLE AMOUNT MANAGING SYSTEM, USABLE AMOUNT MANAGING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2018-031963 filed on Feb. 26, 2018, in the Japan Patent Office, the entire disclosure of which is hereby incorporated by reference herein.

BACKGROUND

Technical Field

The present disclosure relates to a printing apparatus, a usable amount managing system, a usable amount managing method, and a non-transitory recording medium.

Description of the Related Art

In recent years, some printing apparatuses and printing systems perform usable amount management by previously setting a usable amount for each attribute and prohibiting printing when the usable amount is exceeded by a consumption amount. Herein, the attribute is, for example, a group to which a user belongs. The usable amount is an amount reduced by printing, and the consumption amount is an amount consumed by printing.

When a user belonging to a plurality of groups uses a printing apparatus and printing system in which the usable amount management is performed, the usable amount management may be performed based on information of the plurality of groups previously registered by an administrator and information of the respective numbers of prints allowed for the plurality of groups, for example.

SUMMARY

In one embodiment of this invention, there is provided an improved printing apparatus that includes, for example, one or more processors and a memory. The memory stores a plurality of instructions which, when executed by one or more processors, cause the processors to: transmit user identification information for identifying a user to be received at a usable amount management server that manages a usable amount for each attribute to which the user belongs; in response to transmission of the user identification information, receive attribute identification information corresponding to the user identification information; and when the user belongs to a plurality of attributes, control a display to display a screen according to the received attribute identification information to receive setting of a consumption ratio. The usable amount is reduced by printing. The attribute identification information identifies the attribute to which the user belongs. The consumption ratio represents a ratio of a consumption amount of each of the plurality of attributes to a consumption amount consumed by printing by executed the user.

In one embodiment of this invention, there is provided an improved usable amount managing system that includes, for example, the above-described printing apparatus and a usable amount management server that manages the usable amount for each attribute to which a user belongs.

In one embodiment of this invention, there is provided an improved usable amount managing method that includes, for example: transmitting user identification information for identifying a user; in response to transmission of the user identification information, receiving attribute identification information corresponding to the user identification information; and when the user belongs to a plurality of attributes, displaying, on a display, a screen according to the received attribute identification information to receive setting of a consumption ratio. The user identification information is be received at a usable amount management server that manages a usable amount for each attribute to which a user belongs. The usable amount is reduced by printing. The attribute identification information identifies the attribute to which the user belongs. The consumption ratio represents a ratio of a consumption amount of each of the plurality of attributes to a consumption amount consumed by printing executed by the user.

In one embodiment of this invention, there is provided a non-transitory recording medium storing a plurality of instructions which, when executed by one or more processors, cause the processors to perform the above-described usable amount managing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5D is a conceptual diagram illustrating a consumption ratio management table according to the first embodiment;

FIG. 5E is a conceptual diagram illustrating a usable amount management table according to the first embodiment;

FIG. 5F is a conceptual diagram illustrating a consumption amount management table according to the first embodiment;

FIGS. 6A and 6B are a sequence diagram illustrating a process of setting consumption ratios according to the first embodiment;

FIG. 13 is a conceptual diagram illustrating a consumption ratio management table according to a third embodiment of the present invention;

FIG. 18D is a conceptual diagram illustrating a usable amount management table according to the fourth embodiment;

FIG. 18E is a conceptual diagram illustrating a consumption amount management table according to the fourth embodiment;

Figure 1:
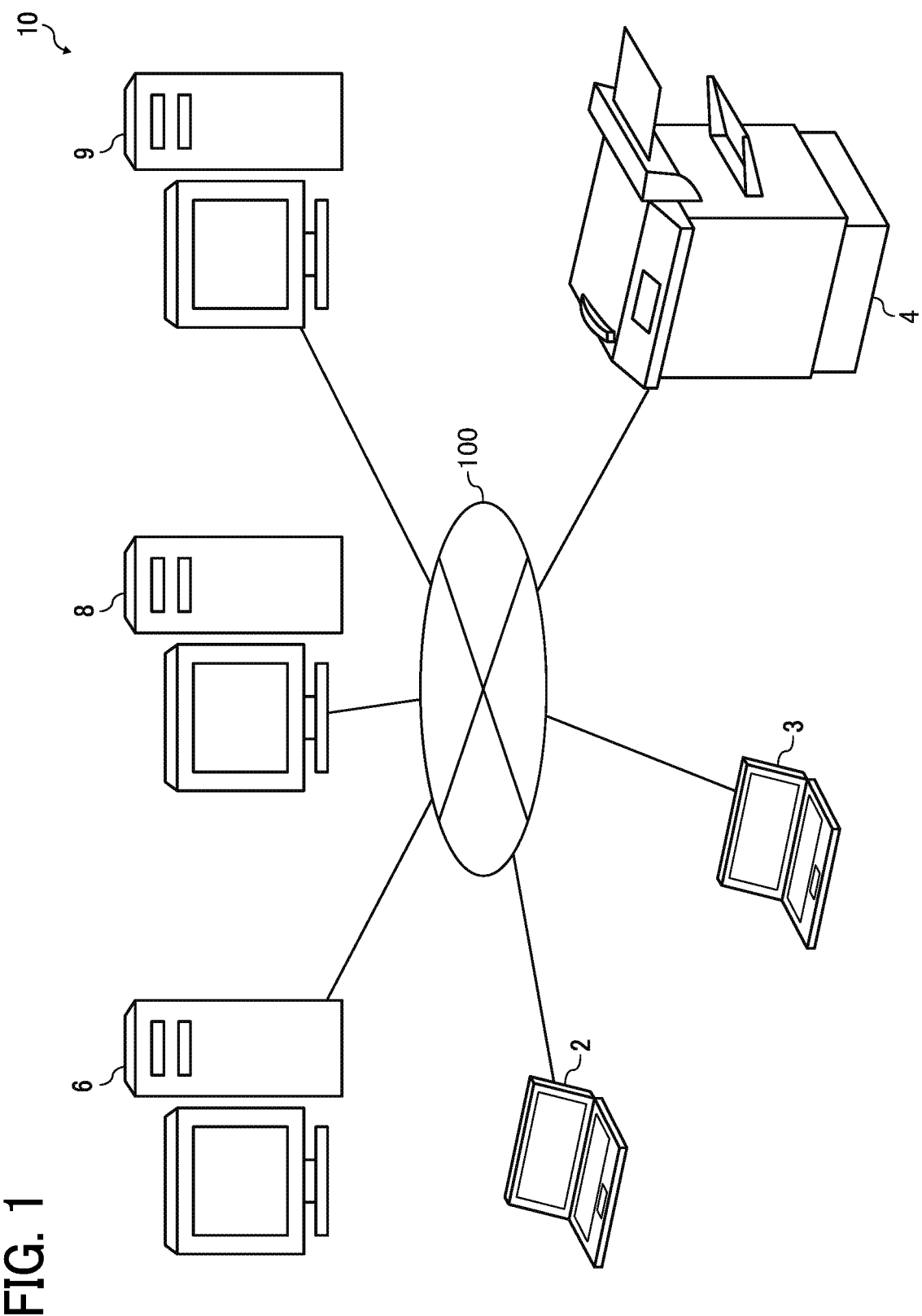
FIG. 1 is a schematic view of a usable amount managing system according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A usable amount managing system according to a first embodiment of the present invention will be described in detail below with FIGS. 1 to 11.

A schematic configuration of the usable amount managing system according to the first embodiment will first be described.

FIG. 1 is a schematic view of the usable amount managing system according to the first embodiment. As illustrated in FIG. 1, a usable amount managing system 10 according to the first embodiment includes an administrator terminal 2, an individual terminal 3, an image forming apparatus 4, an authentication management server 6, a usable amount management server 8, and a print server 9. The administrator terminal 2, the individual terminal 3, the image forming apparatus 4, the authentication management server 6, the usable amount management server 8, and the print server 9 may be simply referred to as the terminals, apparatus, and servers in the following description.

The administrator terminal 2, the individual terminal 3, the image forming apparatus 4, the authentication management server 6, the usable amount management server 8, and the print server 9 form a communication system, and are capable of communicating with each other via a communication network 100. The communication network 100 is the Internet, a mobile communication network, or a local area network (LAN), for example. The communication network 100 may be a wired communication network or a wireless communication network based on a technology such as third generation (3G), worldwide interoperability for microwave access (WiMAX), or long term evolution (LTE), for example.

The administrator terminal 2 is an example of a terminal used by an administrator. The administrator terminal 2 is capable of adding information to, deleting information from, and making a change to a variety of information managed by the usable amount management server 8 via the communication network 100.

The individual terminal 3 is an example of a terminal used by a user. The individual terminal 3 is capable of creating print data and transmitting the created print data to the image forming apparatus 4 via the communication network 100. The print data is data of a document or image to be printed, for example. Examples of the individual terminal 3 include a desktop personal computer (PC), a laptop PC, and a tablet terminal.

The image forming apparatus 4 is an example of a printing apparatus. The image forming apparatus 4 is capable of receiving, via the communication network 100, the print data transmitted from the individual terminal 3, and printing the document or image, for example.

The authentication management server 6 is a server for authenticating the user who uses the image forming apparatus 4.

The usable amount management server 8 is a server for managing a usable amount for each group. Herein, the usable amount is a conceptual amount reduced by printing, such as a monetary amount, a point count, and the amount of a consumable used in image formation, for example. Further, the group is an example of the concept of an attribute to which the user belongs. As well as the group, a company, a department, a team, and a region, for example, are included in the attribute.

The print server 9 is a server for implementing so-called secure printing (i.e., printing based on user authentication). The print server 9 temporarily stores the print data transmitted from the individual terminal 3, and transmits the stored print data to the image forming apparatus 4 in response to a request from the image forming apparatus 4.

Hardware configurations of the terminals, apparatus, and servers forming the usable amount managing system 10 will now be described with FIGS. 2 and 3.

Hardware configurations of the servers and terminals forming the usable amount managing system 10 will first be described.

Figure 2:
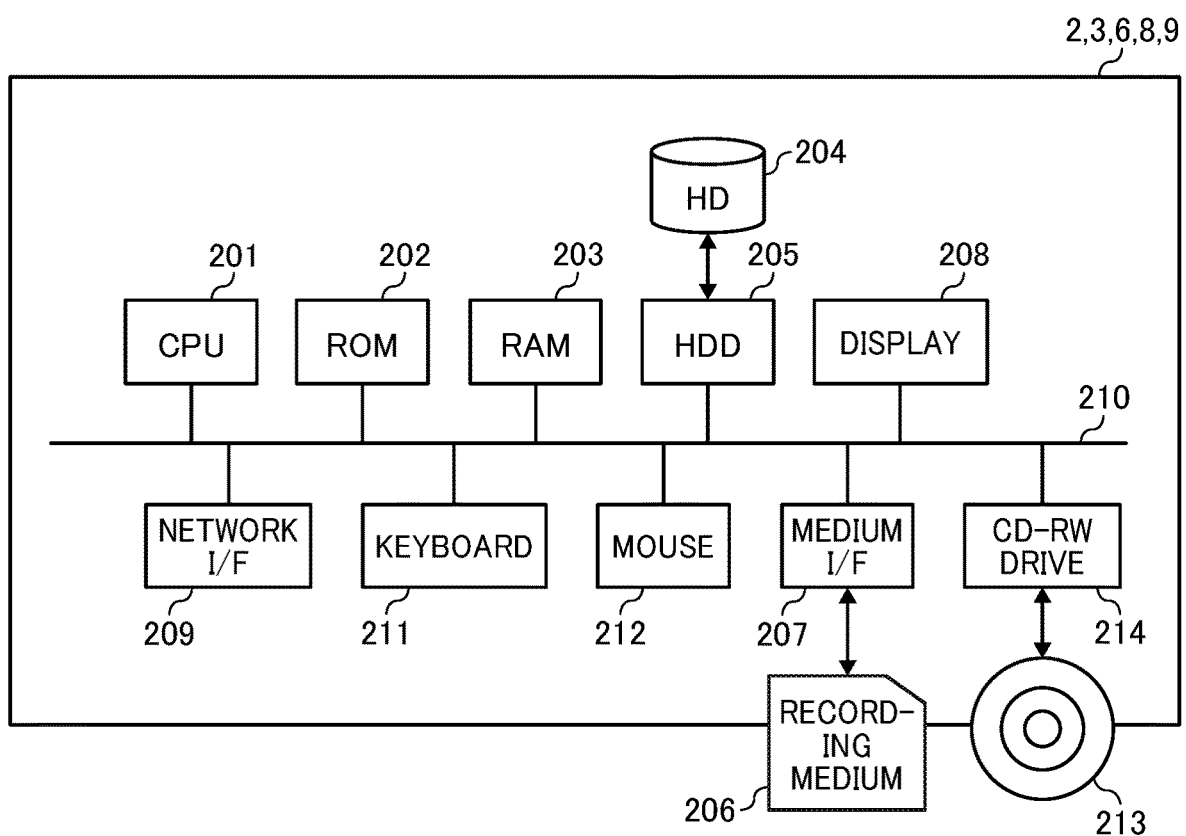
FIG. 2 is a hardware configuration diagram of servers and terminals forming the usable amount managing system according to the first embodiment.

FIG. 2 is a hardware configuration diagram of the servers and terminals forming the usable amount managing system 10. The administrator terminal 2, the individual terminal 3, the authentication management server 6, the usable amount management server 8, and the print server 9 are basically similar in hardware configuration. Therefore, a hardware configuration of the administrator terminal 2 will be described here as a representative example. In the following description, components illustrated in FIG. 2 will be referred to in describing the hardware configurations of the individual terminal 3, the authentication management server 6, the usable amount management server 8, and the print server 9.

The administrator terminal 2 is implemented as a computer. As illustrated in FIG. 2, the administrator terminal 2 includes a central processing unit (CPU) 201, a read-only memory (ROM) 202, a random access memory (RAM) 203, a hard disk (HD) 204, a hard disk drive (HDD) 205, a recording medium 206, a medium interface (I/F) 207, a display 208, a network I/F 209, a keyboard 211, a mouse 212, a compact disc-rewritable (CD-RW) drive 214, and a bus line 210.

The CPU 201 controls an overall operation of the administrator terminal 2. The ROM 202 stores a program used to drive the CPU 201, such as an initial program loader (IPL). The RAM 203 is used as a work area for the CPU 201. The HD 204 stores a variety of data such as programs. The HDD 205 controls writing and reading of a variety of data to and from the HD 204 under the control of the CPU 201. The medium I/F 207 controls data writing (i.e., storage) and reading to and from the recording medium 206, such as a flash memory. The display 208 displays a variety of information, such as a cursor, menus, windows, letters, characters, and images. The network I/F 209 is an interface for performing data communication with the communication network 100. The keyboard 211 is a type of input device including a plurality of keys for inputting letters, characters, numerical values, and a variety if instructions, for example. The mouse 212 is a type of input device for selecting and executing a variety of instructions, selecting a target to be processed, and moving the cursor, for example. The CD-RW drive 214 controls writing and reading of a variety of data to and from a CD-RW 213, which is an example of a removable recording medium. The bus line 210 includes address buses and data buses for electrically connecting the CPU 201 and the other component elements illustrated in FIG. 2.

A hardware configuration of the image forming apparatus 4 forming the usable amount managing system 10 will be described.

Figure 3:
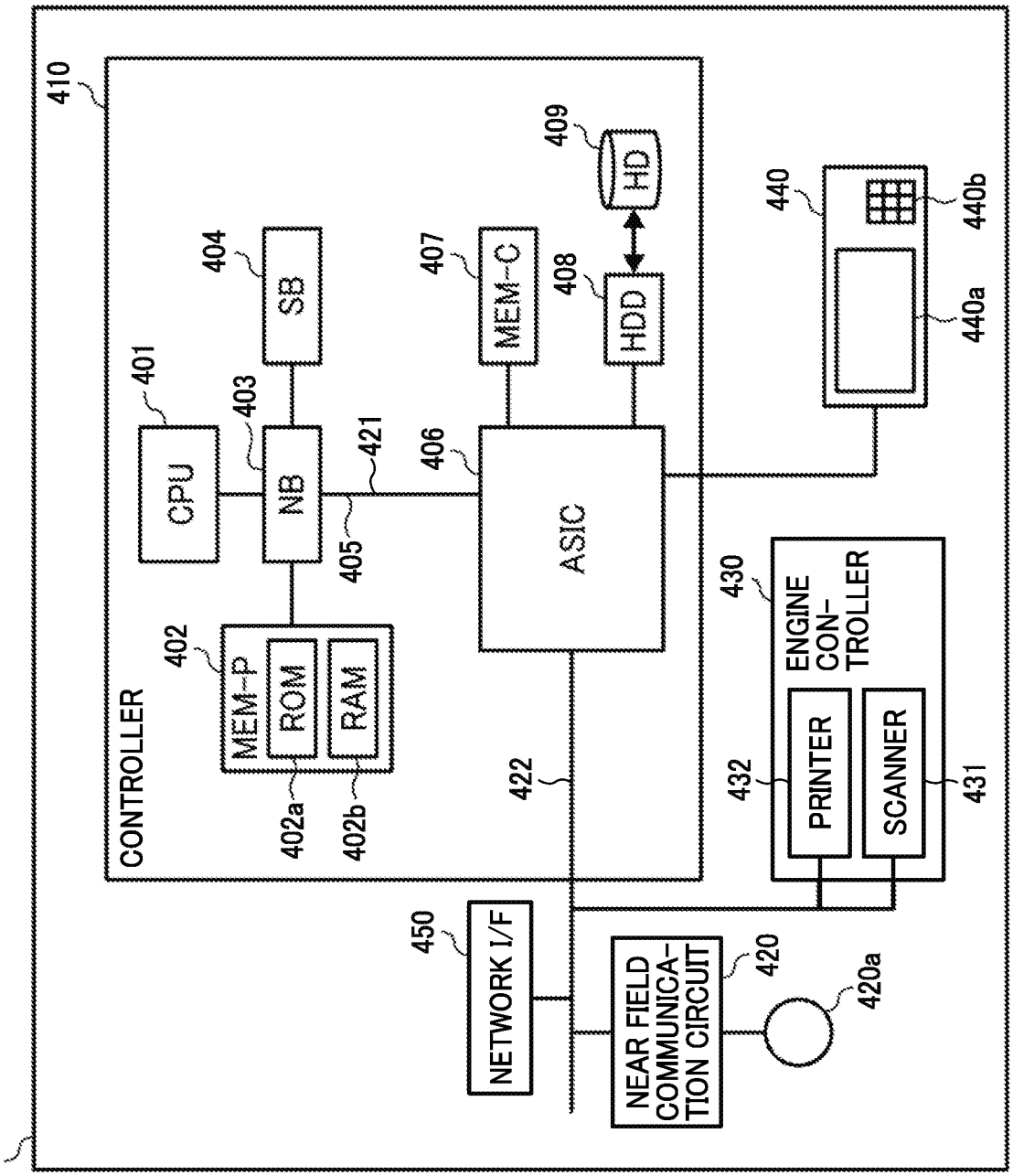
FIG. 3 is a hardware configuration diagram of an image forming apparatus forming the usable amount managing system according to the first embodiment.

FIG. 3 is a hardware configuration diagram of the image forming apparatus 4. As illustrated in FIG. 3, the image forming apparatus 4 includes a controller 410, a near field communication circuit 420, an engine controller 430, an operation panel 440, and a network I/F 450.

The controller 410 includes a CPU 401 as a major unit of a computer forming the image forming apparatus 4, a system memory (MEM-P) 402, a north bridge (NB) 403, a south bridge (SB) 404, an application specific integrated circuit (ASIC) 406, a local memory (MEM-C) 407 as a memory, an HDD 408, and an HD 409 as a memory. The NB 403 and the ASIC 406 are connected by an accelerated graphics port (AGP) bus 421.

The CPU 401 is a control device that performs overall control of the image forming apparatus 4. The NB 403 is a bridge for connecting the CPU 401, the MEM-P 402, the SB 404, and the AGP bus 421. The NB 403 includes a memory controller that controls data writing and reading to and from the MEM-P 402, a peripheral component interconnect (PCI) master, and an AGP target.

The MEM-P 402 includes a ROM 402*a* and a RAM 402*b*. The ROM 402*a* is a memory for storing programs and data for implementing functions of the controller 410. The RAM 402*b* is used as a rendering memory, for example, in deploying a program or data or in memory printing. The program stored in the RAM 402*b* may be provided as recorded on a computer-readable recording medium, such as a CD-ROM, a floppy disk (FD), a CD recordable (CD-R), or a digital versatile disc (DVD), in a file in an installable or executable format.

The SB 404 is a bridge for connecting the NB 403 to a PCI device or a peripheral device. The ASIC 406 is an integrated circuit (IC) for image processing including hardware components for image processing. The ASIC 406 functions as a bridge connecting the AGP bus 421, a PCI bus 422, the HDD 408, and the MEM-C 407. The ASIC 406 includes a PCI target, an AGP master, an arbiter (ARB) as a central unit of the ASIC 406, a memory controller that controls the MEM-C 407, a plurality of direct memory access controllers (DMACs) that perform operations such as rotation of image data based on hardware logic, for example, and a PCI unit that transfers data between a scanner 431 and a printer 432 of the engine controller 430 via the PCI bus 422. The ASIC 406 may be connected to a universal serial bus (USB) interface or an Institute of Electrical and Electronics Engineers (IEEE) 1394 interface.

The MEM-C 407 is a local memory used as a copy image buffer or a code buffer. The HD 409 is a storage for storing image data, font data for use in printing, and forms. The HDD 408 controls data writing and reading to and from the HD 409 under the control of the CPU 401. The AGP bus 421 is a bus interface to a graphics accelerator card proposed to increase the speed of graphics processing. The AGP bus 421 directly accesses the MEM-P 402 with a high throughput, thereby speeding up processing of the graphics accelerator card.

The near field communication circuit 420 includes an antenna 420*a* for a near field communication circuit. The near field communication circuit 420 is a communication circuit using a technology such as near field communication (NFC) or Bluetooth (registered trademark) to perform near field communication.

The engine controller 430 includes the scanner 431 and the printer 432. The operation panel 440 includes a display 440*a* and an operation panel 440*b*. For example, the display 440*a* is a touch panel that displays a current set value and a selection screen, for example, and receives input from the user. The operation panel 440b includes numerical keys for receiving values set for image forming conditions including a density condition and a start key for receiving an instruction to start copying. The controller 410 performs overall control of the image forming apparatus 4, controlling rendering, communication, and input from the operation panel 440, for example. The scanner 431 and the printer 432 include a device that performs image processing such as error diffusion and gamma transformation.

The operation panel 440 includes an application switch key that allows the user to sequentially switch functions of document boxing, copying, printing, and facsimile transmission/reception and select one of these functions. When the document boxing function (i.e., a function of storing print data in the image forming apparatus 4) is selected, the image forming apparatus 4 shifts to a document box mode. When the copying function is selected, the image forming apparatus 4 shifts to a copy mode. When the printing function is selected, the image forming apparatus 4 shifts to a print mode. When the facsimile transmission/reception function is selected, the image forming apparatus 4 shifts to a facsimile mode.

The network I/F 450 is an interface for performing data communication with the communication network 100. The near field communication circuit 420 and the network I/F 450 are electrically connected to the ASIC 406 via the PCI bus 422.

A functional configuration of the usable amount managing system 10 according to the first embodiment will now be described with FIGS. 4A to 4C.

Figure 4A:
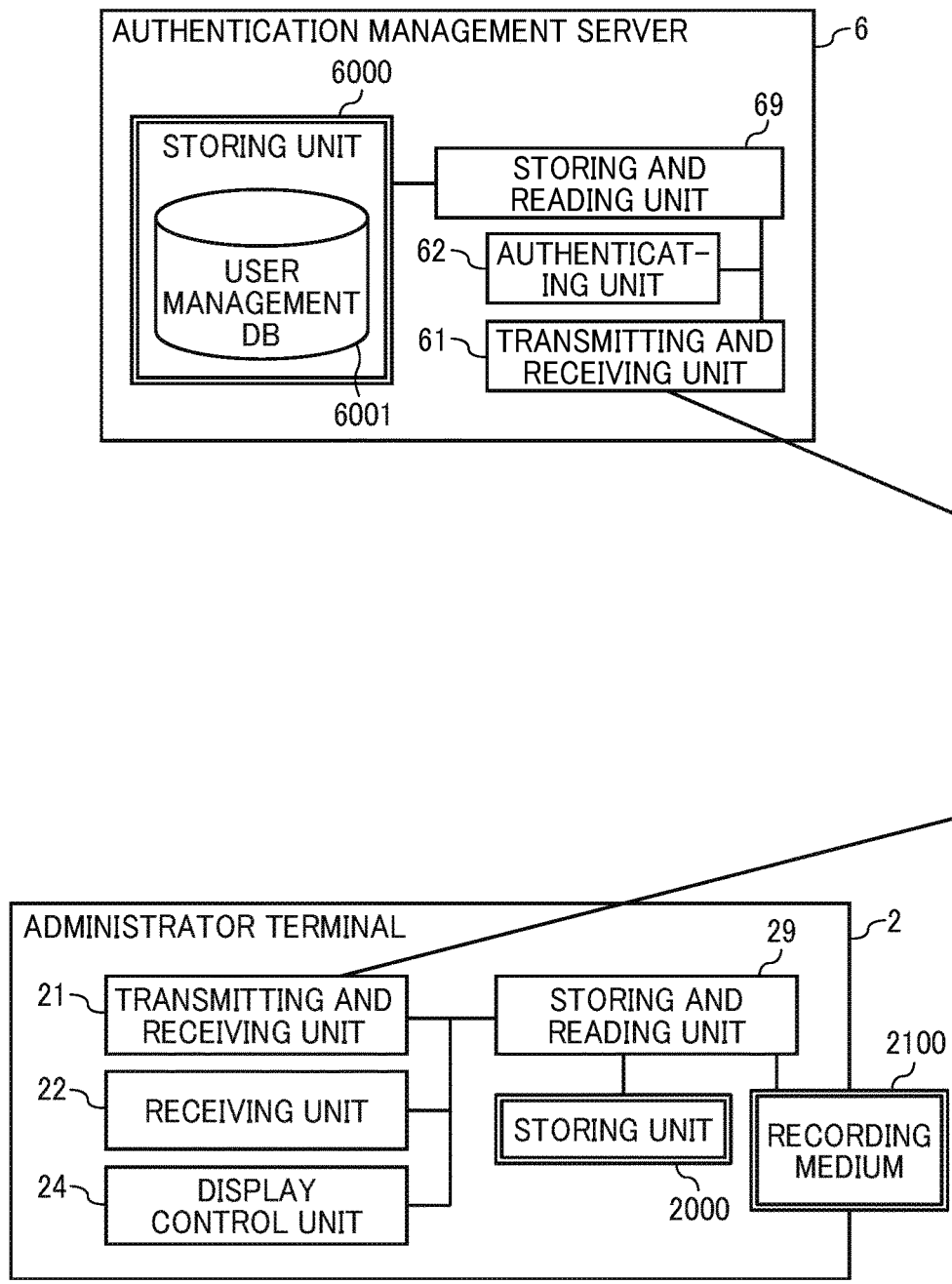
FIGS. 4A to 4C are a functional block diagram of the usable amount managing system according to the first embodiment.
Figure 4B:
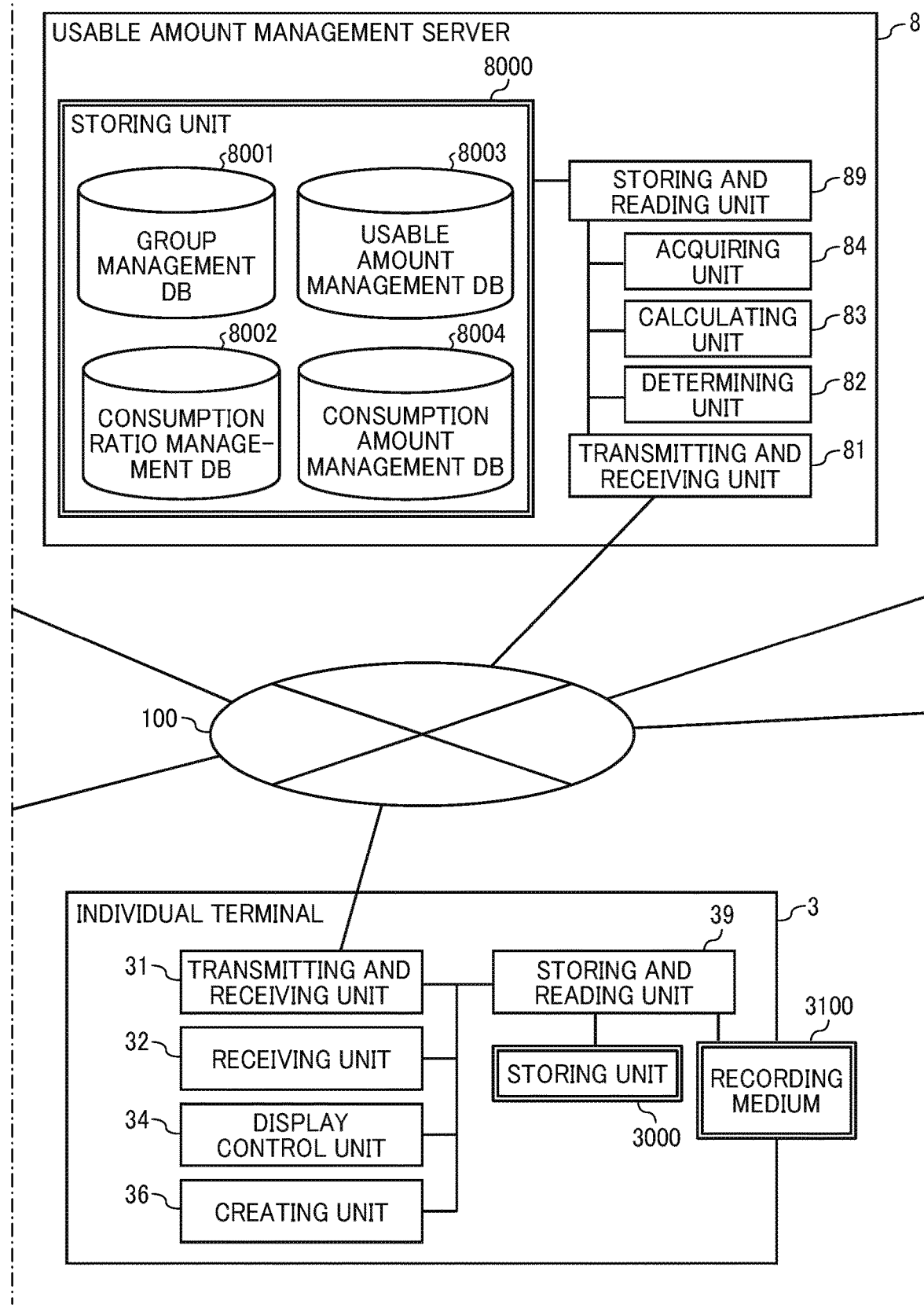
Figure 4C:
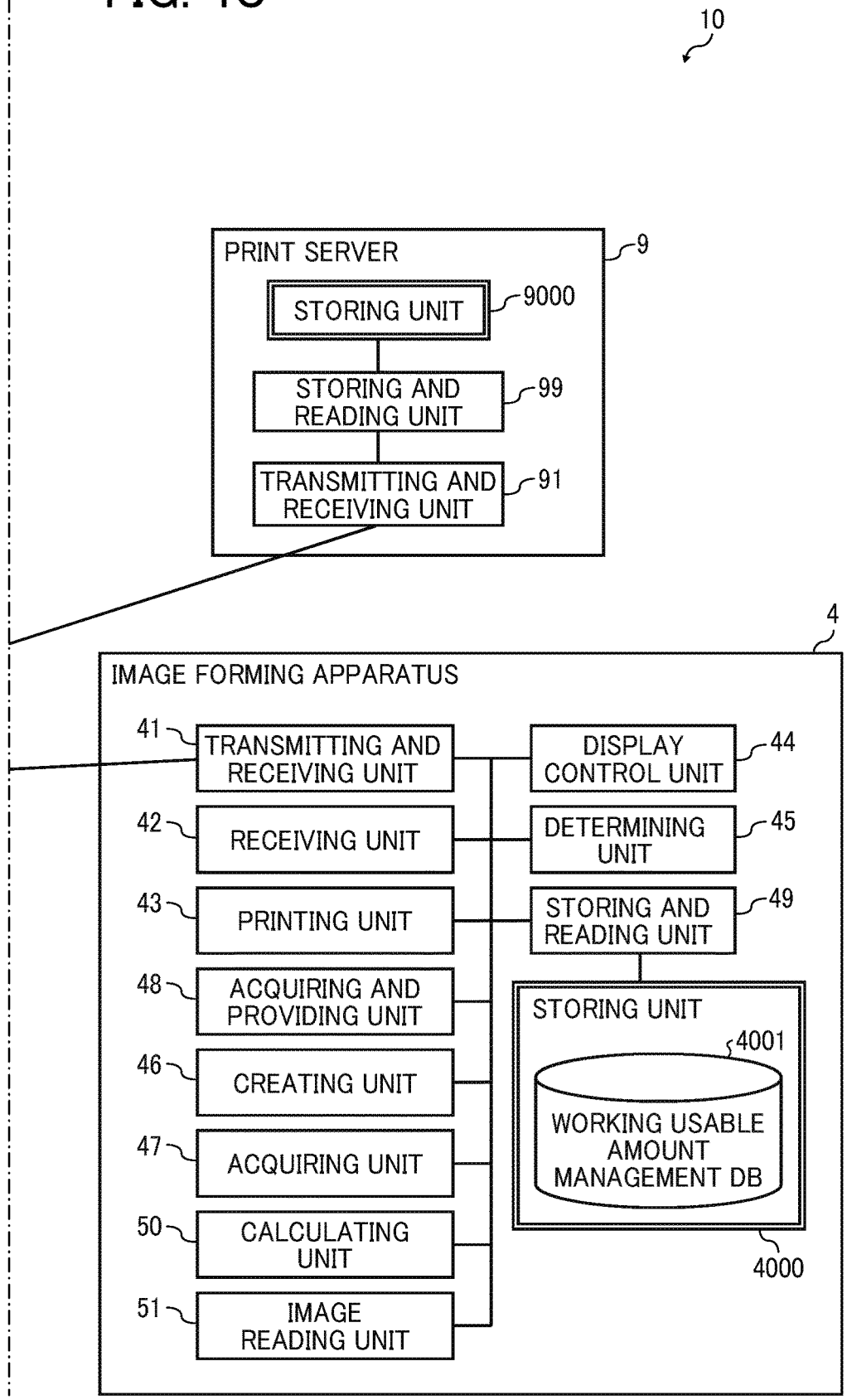

FIGS. 4A to 4C are a functional block diagram of the usable amount managing system 10. FIGS. 4A to 4C illustrate relevant parts of the terminals, apparatus, and servers in FIG. 1 related to processes or operations described later.

A functional configuration of the administrator terminal 2 will first be described.

As illustrated in FIG. 4A, the administrator terminal 2 includes a transmitting and receiving unit 21, a receiving unit 22, a display control unit 24, and a storing and reading unit 29. Each of these units is a function or functional unit implemented when at least one of the component elements illustrated in FIG. 2 operates in response to a command from the CPU 201 in accordance with a terminal program deployed in the RAM 203 from the HD 204. The administrator terminal 2 further includes a storing unit 2000 implemented by the HD 204 illustrated in FIG. 2.

Functional configurations of the units of the administrator terminal 2 will now be described.

The transmitting and receiving unit 21 of the administrator terminal 2 illustrated in FIG. 4A is implemented by a command from the CPU 201 illustrated in FIG. 2 and by the network I/F 209 illustrated in FIG. 2. The transmitting and receiving unit 21 transmits and receives a variety of data or information to and from another terminal, apparatus, or system via the communication network 100.

The receiving unit 22 is mainly implemented by a command from the CPU 201 illustrated in FIG. 2 and by the keyboard 211 and the mouse 212 illustrated in FIG. 2. The receiving unit 22 receives a variety of inputs from the user.

The display control unit 24 is implemented by a command from the CPU 201 illustrated in FIG. 2. The display control unit 24 displays a rendered image, for example, on the display 208 illustrated in FIG. 2.

The storing and reading unit 29 is implemented by a command from the CPU 201 illustrated in FIG. 2 and by the HDD 205 illustrated in FIG. 2. The storing and reading unit 29 performs a process of storing a variety of data in the storing unit 2000 or a recording medium 2100 and a process of reading the variety of data stored in the storing unit 2000 or the recording medium 2100. The recording medium 2100 is implemented by the recording medium 206 illustrated in FIG. 2.

A functional configuration of the individual terminal 3 will be described.

As illustrated in FIG. 4B, the individual terminal 3 includes a transmitting and receiving unit 31, a receiving unit 32, a display control unit 34, a creating unit 36, and a storing and reading unit 39. Each of these units is a function or functional unit implemented when at least one of the component elements illustrated in FIG. 2 operates in response to a command from the CPU 201 in accordance with a terminal program deployed in the RAM 203 from the HD 204. The individual terminal 3 further includes a storing unit 3000 implemented by the HD 204 illustrated in FIG. 2.

Functional configurations of the units of the individual terminal 3 will now be described.

The transmitting and receiving unit 31 of the individual terminal 3 illustrated in FIG. 4B is implemented by a command from the CPU 201 illustrated in FIG. 2 and by the network I/F 209 illustrated in FIG. 2. The transmitting and receiving unit 31 transmits and receives a variety of data or information to and from another terminal, apparatus, or system via the communication network 100.

The receiving unit 32 is mainly implemented by a command from the CPU 201 illustrated in FIG. 2 and by the keyboard 211 and the mouse 212 illustrated in FIG. 2. The receiving unit 32 receives a variety of inputs from the user.

The display control unit 34 is implemented by a command from the CPU 201 illustrated in FIG. 2. The display control unit 34 displays a rendered image, for example, on the display 208 illustrated in FIG. 2.

The creating unit 36 is implemented by a command from the CPU 201 illustrated in FIG. 2. For example, based on print parameters input by the user, the creating unit 36 creates print data to be printed. The print data includes a per-page print parameter corresponding to each page to be printed based on the input print parameters. The print parameters are parameters specifying print types, and are set by selection of monochrome printing or color printing, the sheet size (e.g., A4 or A3), the print side (i.e., one-sided or double-sided), and increase or decrease of the number of copies, for example.

The storing and reading unit 39 is implemented by a command from the CPU 201 illustrated in FIG. 2 and by the HDD 205 illustrated in FIG. 2. The storing and reading unit 39 performs a process of storing a variety of data in the storing unit 3000 or a recording medium 3100 and a process of reading the variety of data stored in the storing unit 3000 or the recording medium 3100. The recording medium 3100 is implemented by the recording medium 206 illustrated in FIG. 2.

A functional configuration of the image forming apparatus 4 will be described.

As illustrated in FIG. 4C, the image forming apparatus 4 includes a transmitting and receiving unit 41, a receiving unit 42, a printing unit 43, a display control unit 44, a determining unit 45, a creating unit 46, an acquiring unit 47, an acquiring and providing unit 48, a storing and reading unit 49, a calculating unit 50, and an image reading unit 51. Each of these units is a function or functional unit implemented when at least one of the component elements illustrated in FIG. 3 operates in response to a command from the CPU 401 in accordance with a print program deployed in the RAM 402b. The image forming apparatus 4 further includes a storing unit 4000 implemented by the HD 409 illustrated in FIG. 3.

Figure 5A:
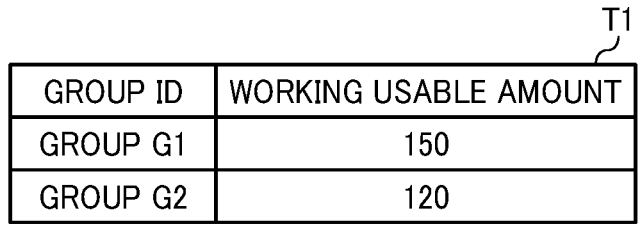
FIG. 5A is a conceptual diagram illustrating a working usable amount management table according to the first embodiment.

FIG. 5A is a conceptual diagram illustrating a working usable amount management table. The storing unit 4000 includes a working usable amount management database (DB) 4001, which is configured as a working usable amount management table T1 illustrated in FIG. 5A. In the working usable amount management table T1, a working usable amount is managed in association with a group identification (ID). The group ID identifies a group to which the user of the image forming apparatus 4 belongs. The group ID is an example of attribute identification information for identifying an attribute to which the user belongs to. The working usable amount represents a provisional usable amount calculated for each group by the image forming apparatus 4, and is distinguished from a usable amount ultimately calculated by the usable amount management server 8. The working usable amount is an example of the usable amount.

Functional configurations of the units of the image forming apparatus 4 will now be described in detail. In the following description of the functional configurations of the units of the image forming apparatus 4, relationships with major component elements of the image forming apparatus 4 in FIG. 3 for implementing the functional configurations of the units of the image forming apparatus 4 will also be described.

The transmitting and receiving unit 41 of the image forming apparatus 4 illustrated in FIG. 4C is mainly implemented by a command from the CPU 401 illustrated in FIG. 3 and by the network I/F 450 illustrated in FIG. 3. The transmitting and receiving unit 41 transmits and receives a variety of data or information to and from another terminal, apparatus, or system via the communication network 100.

The receiving unit 42 is mainly implemented by a command from the CPU 401 illustrated in FIG. 3 and by the operation panel 440 illustrated in FIG. 3. The receiving unit 42 receives a variety of inputs from the user, such as the setting of a consumption ratio desired by the user, for example.

The display control unit 44 is mainly implemented by a command from the CPU 401 illustrated in FIG. 3. The display control unit 44 displays a variety of screens on the operation panel 440 based on a variety of screen data for displaying the screens. For example, the display control unit 44 displays a screen for displaying respective consumption ratios of groups based on group IDs and consumption ratios received from the usable amount management server 8, and receiving the setting of consumption ratios desired by the user.

The creating unit 46 is mainly implemented by a command from the CPU 401 illustrated in FIG. 3. The creating unit 46 creates screen data to be used by the display control unit 44 to display the screens.

The acquiring unit 47 is mainly implemented by a command from the CPU 401 illustrated in FIG. 3. The acquiring unit 47 acquires the per-page print parameter of a predetermined page of the print data.

The acquiring and providing unit 48 is implemented by a command from the CPU 401 illustrated in FIG. 3 and by the near field communication circuit 420 and the antenna 420a thereof illustrated in FIG. 3. The acquiring and providing unit 48 provides and acquires data to and from an IC card or a smartphone, for example, through near field communication.

The storing and reading unit 49 is implemented by a command from the CPU 401 illustrated in FIG. 3 and by the HDD 408 illustrated in FIG. 3 to perform a process of storing a variety of data in the storing unit 4000 and a process of reading the variety of data stored in the storing unit 4000. The storing and reading unit 49 is further implemented by a command from the CPU 401 illustrated in FIG. 3 and by the HDD 408 illustrated in FIG. 3 to perform a process of storing cumulatively stored per-page print parameters in the storing unit 4000 and a process of reading the cumulatively stored per-page print parameters stored in the storing unit 4000, for example.

The calculating unit 50 is mainly implemented by a command from the CPU 401 illustrated in FIG. 3 to perform a variety of calculations. For example, the calculating unit 50 calculates a per-group consumption amount based on the user-desired consumption ratio received by the receiving unit 42. Herein, the consumption amount represents an amount consumed by printing, and the per-group consumption amount represents the consumption amount of each group.

The determining unit 45 is mainly implemented by a command from the CPU 401 illustrated in FIG. 3 to make a variety of determinations. For example, the determining unit 45 determines whether the per-group consumption amount calculated for a group by the calculating unit 50 is greater than the working usable amount corresponding to the group.

The printing unit 43 is mainly implemented by a command from the CPU 401 illustrated in FIG. 3 and by the printer 432 illustrated in FIG. 3 to print the print data (i.e., data of an image to be printed). For example, the printing unit 43 prints the print data when it is not determined by the determining unit 45 that the per-group consumption amount calculated for a group by the calculating unit 50 is greater than the working usable amount corresponding to the group.

The image reading unit 51 is implemented by a command from the CPU 401 illustrated in FIG. 3 and by the scanner 431 illustrated in FIG. 3 to scan a print material and thereby acquire the print data from the print material.

A functional configuration of the authentication management server 6 will be described.

As illustrated in FIG. 4A, the authentication management server 6 includes a transmitting and receiving unit 61, an authenticating unit 62, and a storing and reading unit 69. Each of these units is a function or functional unit implemented when at least one of the component elements illustrated in FIG. 2 operates in response to a command from the CPU 201 in accordance with a terminal program deployed in the RAM 203 from the HD 204. The authentication management server 6 further includes a storing unit 6000 implemented by the HD 204 illustrated in FIG. 2.

Figure 5B:
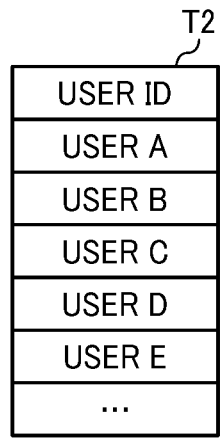
FIG. 5B is a conceptual diagram illustrating a user management table according to the first embodiment.

FIG. 5B is a conceptual diagram illustrating a user management table. The storing unit 6000 stores a user management DB 6001, which is configured as a user management table T2 illustrated in FIG. 5B. In the user management table T2, a user ID for identifying the user using the image forming apparatus 4 is managed. The user ID is an example of user identification information. The user identification information includes an employee number, a driver's license number, and a social security number (e.g., My Number for the social security and taxation system in Japan), for example.

Functional configurations of the units of the authentication management server 6 will now be described in detail. In the following description of the functional configurations of the units of the authentication management server 6, relationships with major component elements of the authentication management server 6 in FIG. 2 for implementing the functional configurations of the units of the authentication management server 6 will also be described.

The transmitting and receiving unit 61 of the authentication management server 6 illustrated in FIG. 4A is implemented by a command from the CPU 201 illustrated in FIG. 2 and by the network I/F 209 illustrated in FIG. 2. The transmitting and receiving unit 61 transmits and receives a variety of data or information to and from another terminal, apparatus, or system via the communication network 100.

The authenticating unit 62 is implemented by a command from the CPU 201 illustrated in FIG. 2. For example, the authenticating unit 62 determines whether the user ID transmitted from the image forming apparatus 4 via the usable amount management server 8 matches a previously registered user ID.

The storing and reading unit 69 is implemented by a command from the CPU 201 illustrated in FIG. 2 and by the HDD 205 illustrated in FIG. 2. The storing and reading unit 69 performs a process of storing a variety of data in the storing unit 6000 and a process of reading the variety of data stored in the storing unit 6000.

A functional configuration of the usable amount management server 8 will be described.

As illustrated in FIG. 4B, the usable amount management server 8 includes a transmitting and receiving unit 81, a determining unit 82, a calculating unit 83, an acquiring unit 84, and a storing and reading unit 89. Each of these units is a function or functional unit implemented when at least one of the component elements illustrated in FIG. 2 operates in response to a command from the CPU 201 in accordance with a terminal program deployed in the RAM 203 from the HD 204. The usable amount management server 8 further includes a storing unit 8000 implemented by the HD 204 illustrated in FIG. 2.

Figure 5C:
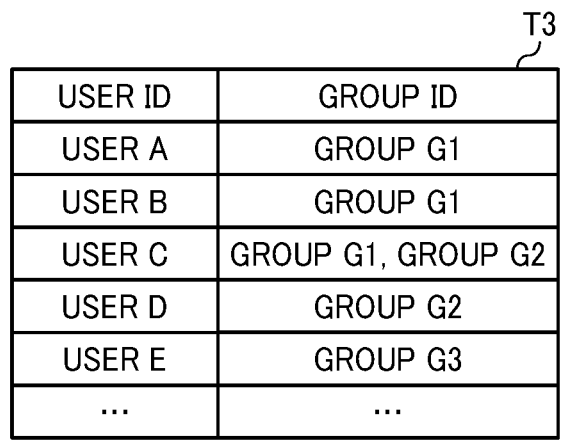
FIG. 5C is a conceptual diagram illustrating a group management table according to the first embodiment.

FIG. 5C is a conceptual diagram illustrating a group management table. The storing unit 8000 includes a group management DB 8001, which is configured as a group management table T3 illustrated in FIG. 5C. In the group management table T3, the group ID is managed in association with the user ID.

FIG. 5D is a conceptual diagram illustrating a consumption ratio management table. The storing unit 8000 includes a consumption ratio management DB 8002, which is configured as a consumption ratio management table T4 illustrated in FIG. 5D. In the consumption ratio management table T4, a consumption ratio is managed in association with the user ID. Herein, the consumption ratio represents the ratio of the per-group consumption amount to the consumption amount consumed by image formation executed by the user. For example, when the consumption amount is represented as 1, the consumption ratio may be expressed as a numerical value representing the ratio of the per-group consumption amount to the consumption amount of 1 (e.g., 0.6 for a group G1 and 0.4 for a group G2). The numerical value may be expressed in percentage, for example. The consumption ratio is an example of consumption ratio information.

FIG. 5E is a conceptual diagram illustrating a usable amount management table. The storing unit 8000 includes a usable amount management DB 8003, which is configured as a usable amount management table T5 illustrated in FIG. 5E. In the usable amount management table T5, the usable amount for each group is managed in association with the group ID. For example, if the usable amount represents a monetary amount, each group is allocated with a certain amount of money, such as 150 yen for the group G1 and 200 yen for the group G2. The usable amount is an example of usable amount information.

FIG. 5F is a conceptual diagram illustrating a consumption amount management table. The storing unit 8000 includes a consumption amount management DB 8004, which is configured as a consumption amount management table T6 illustrated in FIG. 5F. In the consumption amount management table T6, a consumption amount parameter is managed in association with the user ID. In the consumption amount parameter, the print parameters are associated with respective consumption amounts. For example, in the consumption amount parameter, respective print types determined by the print parameters are associated with corresponding costs (e.g., 2 yen for monochrome simplex printing, 3 yen for monochrome duplex printing, 6 yen for color simplex printing, and 9 yen for color duplex printing). The consumption amount parameter is an example of consumption amount parameter information. In the consumption amount management table T6 of the first embodiment, the consumption amount parameter is managed in association with the user ID. The consumption amount parameter, however, may be managed in association with the group ID or an image forming apparatus ID for identifying an image forming apparatus, in place of the user ID. Further, the consumption amount parameter may be fixed regardless of the user, group, or image forming apparatus.

Functional configurations of the units of the usable amount management server 8 will now be described in detail. In the following description of the functional configurations of the units of the usable amount management server 8, relationships with major component elements of the usable amount management server 8 in FIG. 2 for implementing the functional configurations of the units of the usable amount management server 8 will also be described.

The transmitting and receiving unit 81 of the usable amount management server 8 illustrated in FIG. 4B is implemented by a command from the CPU 201 illustrated in FIG. 2 and by the network I/F 209 illustrated in FIG. 2. The transmitting and receiving unit 81 transmits and receives a variety of data or information to and from another terminal, apparatus, or system via the communication network 100.

The determining unit 82 is mainly implemented by a command from the CPU 201 illustrated in FIG. 2 to make a variety of determinations.

The calculating unit 83 is mainly implemented by a command from the CPU 201 illustrated in FIG. 2 to perform a variety of calculations.

The acquiring unit 84 is mainly implemented by a command from the CPU 201 illustrated in FIG. 2. For example, the acquiring unit 84 acquires the print parameters and the number of prints (i.e., print number) from the cumulatively stored per-page print parameters.

The storing and reading unit 89 is implemented by a command from the CPU 201 illustrated in FIG. 2 and by the HDD 205 illustrated in FIG. 2. The storing and reading unit 89 performs a process of storing a variety of data in the storing unit 8000 and a process of reading the variety of data stored in the storing unit 8000.

A functional configuration of the print server 9 will be described.

The print server 9 includes a transmitting and receiving unit 91 and a storing and reading unit 99. Each of these units is a function or functional unit implemented when at least one of the component elements of the print server 9 illustrated in FIG. 2 operates in response to a command from the CPU 201 in accordance with a print management program deployed in the RAM 203 from the HD 204. The print server 9 further includes a storing unit 9000 implemented by the HD 204 illustrated in FIG. 2. The storing unit 9000 stores the data of the image (i.e., the print data in the present example) transmitted from the image forming apparatus 4, for example.

Functional configurations of the units of the print server 9 will now be described in detail. In the following description of the functional configurations of the units of the print server 9, relationships with major component elements of the print server 9 in FIG. 2 for implementing the functional configurations of the units of the print server 9 will also be described.

The transmitting and receiving unit 91 of the print server 9 illustrated in FIG. 4C is implemented by a command from the CPU 201 illustrated in FIG. 2 and by the network I/F 209 illustrated in FIG. 2. The transmitting and receiving unit 91 transmits and receives a variety of data or information to and from another terminal, apparatus, or system via the communication network 100.

The storing and reading unit 99 is implemented by a command from the CPU 201 illustrated in FIG. 2 and by the HDD 205 illustrated in FIG. 2. The storing and reading unit 99 performs a process of storing a variety of data in the storing unit 9000 and a process of reading the variety of data stored in the storing unit 9000.

Processes or operations of the first embodiment will be described below.

It is assumed here that a user C belonging to both the group G1 and the group G2 may make a print of print content related only to business of the group G1 or may make a print of print content related to business covered by both the group G1 and the group G2. That is, the contribution ratio of the user C to the group G1 and the contribution ratio of the user C to the group G2 vary depending on which of the two types of print content is printed. It is also assumed that, when the user C makes a print of print content related only to business of the group G1, the user C desires the consumption ratio of the group G1 and the consumption ratio of the group G2 to be set as 100% and 0%, respectively, to be used in the management of the usable amounts. It is further assumed that, when the user C makes a print of print content related to business covered by both the group G1 and the group G2, the user C desires the consumption ratio of the group G1 and the consumption ratio of the group G2 to be set as 60% and 40%, respectively, to be used in the management of the usable amounts. It is also assumed that the consumption ratios of the user C initially set by the administrator with the administrator terminal 2 are 100% for the group G1 and 0% for the group G2. The following description will be given of processes or operations performed in this case when the user C makes a print of print content related to business covered by both the group G1 and the group G2, and desires the consumption ratios to be changed to 60% for the group G1 and 40% for the group G2 to be used in the management of the usable amounts. Hereinafter, the respective group IDs of the group G1 and the group G2 will be described as GROUP G1 and GROUP G2, and the user ID of the user C will be described as USER C.

The setting of the consumption ratios performed on the image forming apparatus 4 by the user C will first be described with FIGS. 6A to 8B.

Figure 6A:
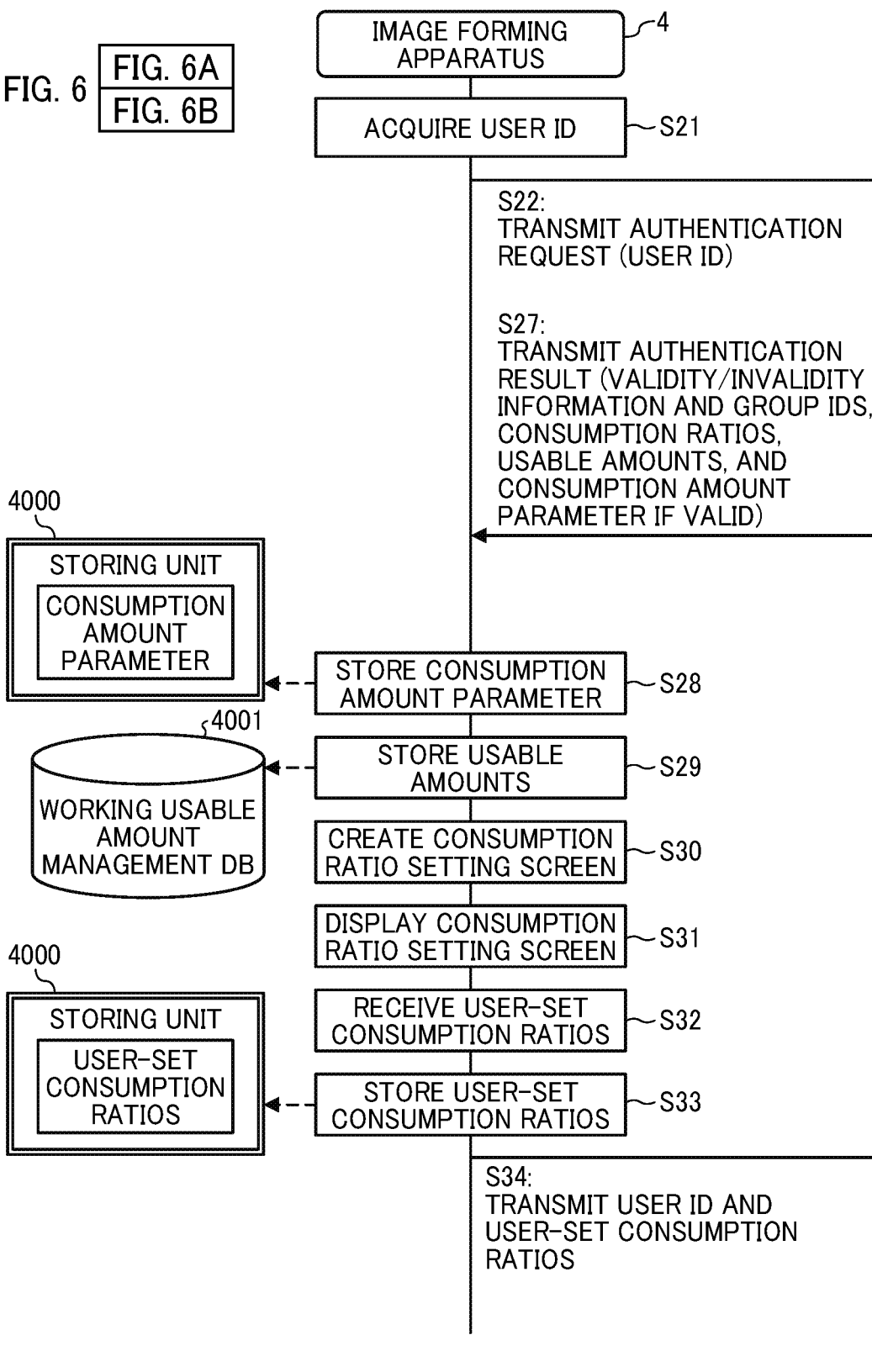
Figure 7:
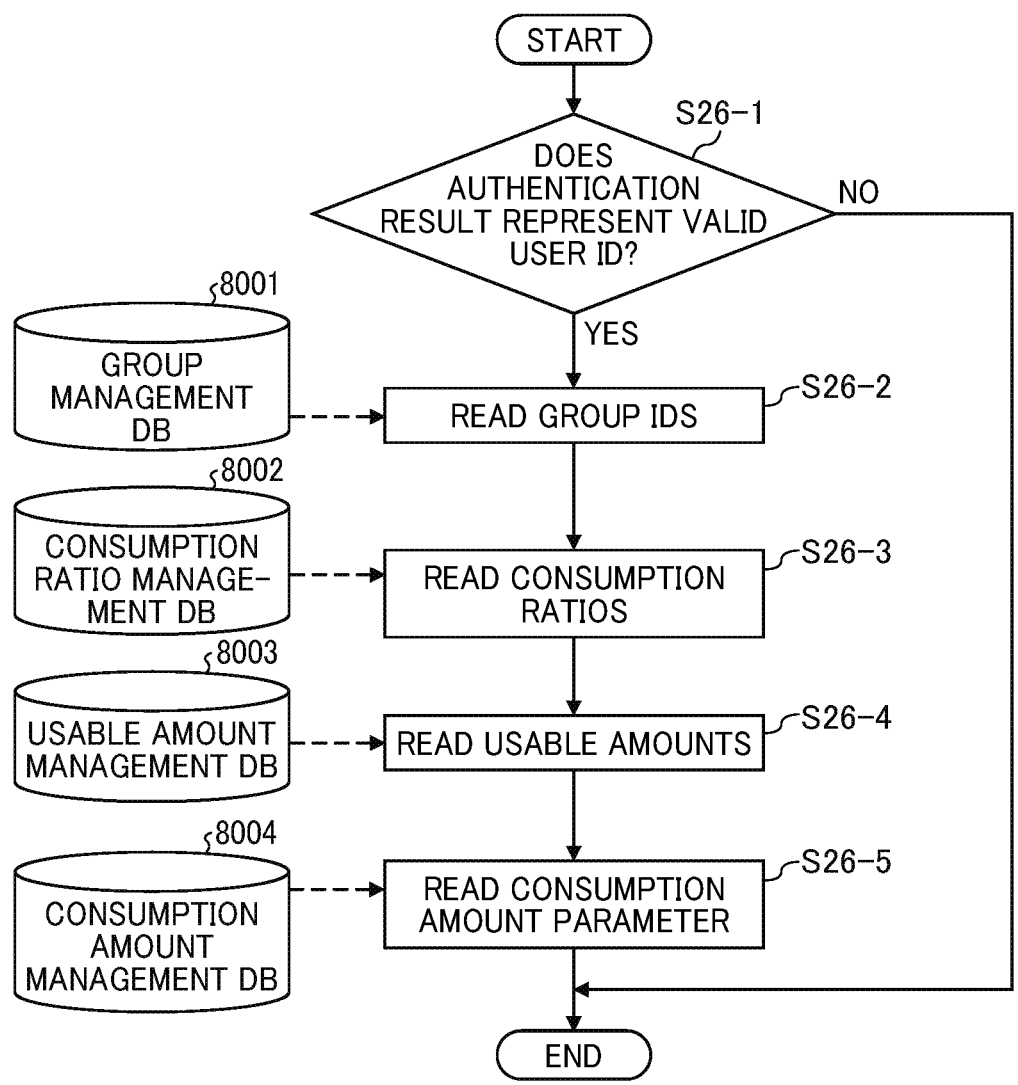
FIG. 7 is a flowchart illustrating a process of reading a variety of information for setting the consumption ratios according to the first embodiment.
Figure 8A:
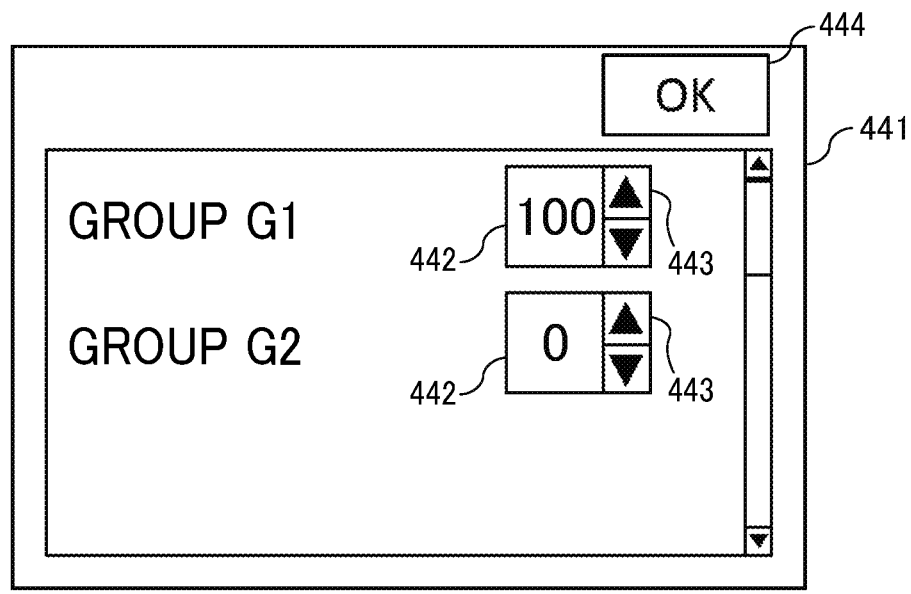
FIGS. 8A and 8B are diagrams illustrating an exemplary screen displayed on a display of the image forming apparatus according to the first embodiment.
Figure 8B:
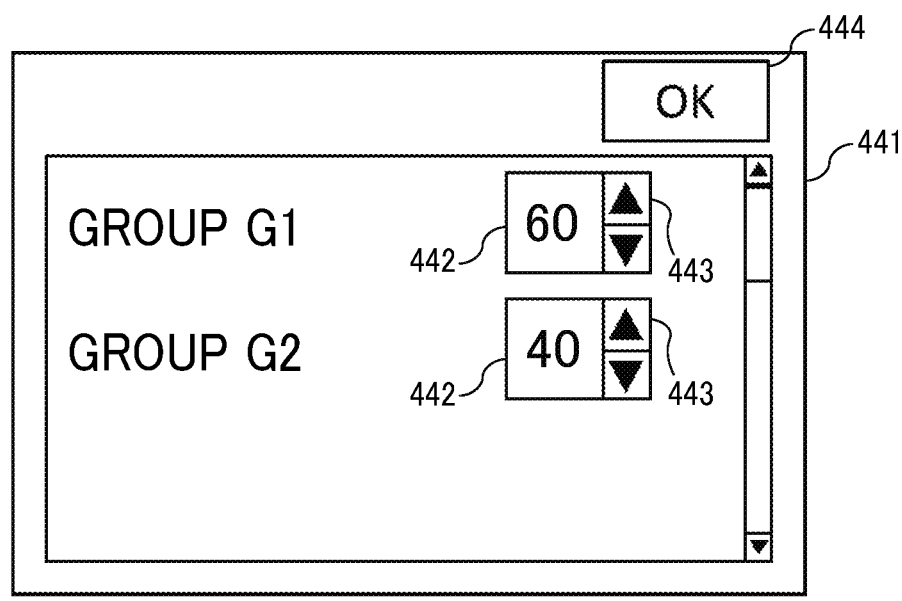

FIGS. 6A and 6B are a sequence diagram illustrating a process of setting the consumption ratios. FIG. 7 is a flowchart illustrating a process of reading a variety of information for setting the consumption ratios. FIGS. 8A and 8B are diagrams illustrating an exemplary screen displayed on the display 440a of the image forming apparatus 4.

As illustrated in FIG. 6A, when the user C brings his or her IC card into proximity of the antenna 420a of the near field communication circuit 420 of the image forming apparatus 4 (i.e., when the user C holds the IC card over the antenna 420a), the acquiring and providing unit 48 of the image forming apparatus 4 acquires USER C from the IC card as the user ID of the user C (step S21). Then, the transmitting and receiving unit 41 of the image forming apparatus 4 transmits request information representing a request for login authentication to the usable amount management server 8 (step S22). The transmitting and receiving unit 81 of the usable amount management server 8 then transmits, to the authentication management server 6, the request information of the request for login authentication received at step S22 (step S23). The request information of the request for login authentication transmitted at steps S22 and S23 includes the user ID (i.e., USER C) acquired at step S21. Thereby, the transmitting and receiving unit 61 of the authentication management server 6 receives the request information of the request for login authentication.

Then, the authenticating unit 62 of the authentication management server 6 performs login authentication on the IC card with the user ID (i.e., USER C) (step S24). Specifically, using the user ID (i.e., USER C) received at step S23 as a search key, the storing and reading unit 69 searches through the user management DB 6001 (i.e., the user management table T2 in FIG. 5B) for a stored user ID corresponding to the received user ID (i.e., USER C). If there is a stored user ID corresponding to the received user ID (i.e., USER C), the authenticating unit 62 determines that the IC card is valid (i.e., the user ID is valid). If there is no stored user ID corresponding to the received user ID (i.e., USER C), the authenticating unit 62 determines that the IC card is invalid (i.e., the user ID is invalid).

Then, the transmitting and receiving unit 61 of the authentication management server 6 transmits an authentication result to the usable amount management server 8 (step S25). If the authenticating unit 62 determines that the IC card is valid, the authentication result includes information indicating that the IC card is valid. If the authenticating unit 62 determines that the IC card is invalid, the authentication result includes information indicating that the IC card is invalid. Thereby, the transmitting and receiving unit 81 of the usable amount management server 8 receives the authentication result.

The usable amount management server 8 then performs a process of reading a variety of information for setting the consumption ratios based on the authentication result (step S26).

The process of step S26 will now be described in detail with FIG. 7, which is a flowchart illustrating a process of reading a variety of information for setting the consumption ratios.

As illustrated in FIG. 7, the determining unit 82 of the usable amount management server 8 determines whether the authentication result received at step S25 includes the information indicating that the IC card is valid, i.e., whether the user ID acquired at step S21 is valid (step S26-1). If the determining unit 82 determines at step S26-1 that the received authentication result includes the information indicating that the user ID is valid, i.e., if the determining unit 82 determines a login success (YES at step S26-1), the storing and reading unit 89 performs a search through the group management DB 8001 (i.e., the group management table T3 in FIG. 5C) by using the user ID (i.e., USER C) received at step S22 as a search key, to thereby read GROUP G1 and GROUP G2 as the corresponding group IDs (step S26-2). The storing and reading unit 89 then performs a search through the consumption ratio management DB 8002 (i.e., the consumption ratio management table T4 in FIG. 5D) by using the user ID (i.e., USER C) received at step S22 as a search key, to thereby read GROUP G1=1 and GROUP G2=0 as the corresponding consumption ratios (step S26-3). The storing and reading unit 89 then performs a search through the usable amount management DB 8003 (i.e., the usable amount management table T5 in FIG. 5E) by using the group IDs (i.e., GROUP G1 and GROUP G2) read at step S26-2 as a search key, to thereby read 150 (i.e., the usable amount of the group G1) and 200 (i.e., the usable amount of the group G2) as the corresponding usable amounts (step S26-4). If the storing and reading unit 89 reads a plurality of group IDs at step S26-2, the storing and reading unit 89 reads the respective usable amounts corresponding to the plurality of group IDs. The storing and reading unit 89 then performs a search through the consumption amount management DB 8004 (i.e., the consumption amount management table T6 in FIG. 5F) by using the user ID (i.e., USER C) received at step S22 as a search key, to thereby read MONOCHROME SIMPLEX PRINTING=2, MONOCHROME DUPLEX PRINTING=3, COLOR SIMPLEX PRINTING=6, COLOR DUPLEX PRINTING=9 as the corresponding consumption amount parameter (step S26-5). Then, the procedure proceeds to the process of step S27. If the determining unit 82 determines at step S26-1 that the received authentication result does not include the information indicating that the user ID is valid, i.e., if the determining unit 82 determines a login failure (NO at step S26-1), the procedure also proceeds to the process of step S27.

Referring back to FIG. 6A, the transmitting and receiving unit 81 of the usable amount management server 8 transmits the authentication result to the image forming apparatus 4 (step S27). If the determining unit 82 determines at step S26-1 that the authentication result includes the information indicating that the user ID is valid, the authentication result includes the information of validity of the user ID received at step S25, the group IDs (i.e., GROUP G1 and GROUP G2) read at step S26-2, the consumption ratios (i.e., GROUP G1=1 and GROUP G2=0) read at step S26-3, the usable amounts (i.e., 150 as the usable amount of the group G1 and 200 as the usable amount of the group G2) read at step S26-4, and the consumption amount parameter (i.e., MONOCHROME SIMPLEX PRINTING=2, MONOCHROME DUPLEX PRINTING=3, COLOR SIMPLEX PRINTING=6, COLOR DUPLEX PRINTING=9) read at step S26-5. Thereby, the transmitting and receiving unit 41 of the image forming apparatus 4 receives the authentication result with the information indicating that the user ID is valid. Then, the image forming apparatus 4 sets the logged-in user (i.e., the user C in this example) as the user who is to execute printing, and proceeds to the process of step S28. If the determining unit 82 determines at step S26-1 that the authentication result does not include the information indicating that the user ID is valid, the authentication result includes the information indicating that the user ID is invalid. Thereby, the transmitting and receiving unit 41 of the image forming apparatus 4 receives the authentication result with the information indicating that the user ID is invalid. Then, the display control unit 44 displays an error screen on the display 440a. The following description will be given of processes performed when the transmitting and receiving unit 41 receives the information indicating that the user ID is valid.

In the image forming apparatus 4, the storing and reading unit 49 stores and manages the consumption amount parameter received at step S27 in the storing unit 4000 (step S28).

Then, in the image forming apparatus 4, the storing and reading unit 49 stores and manages the group IDs (i.e., GROUP G1 and GROUP G2) and the corresponding usable amounts (i.e., 150 as the usable amount of the group G1 and 200 as the usable amount of the group G2) received at step S27 in the working usable amount management DB 4001 (i.e., the working usable amount management table T1 in FIG. 5A) such that the group IDs and the usable amounts are associated with each other (step S29).

Based on the group IDs (i.e., GROUP G1 and GROUP G2) and the consumption ratios (i.e., GROUP G1=1 and GROUP G2=0) received at step S27, the creating unit 46 of the image forming apparatus 4 then creates screen data for displaying a screen that displays the respective consumption ratios of the groups and receives user-set consumption ratios desired by the user C (step S30). Based on the screen data created at step S30, the display control unit 44 then displays, on the display 440a, a consumption ratio setting screen 441 illustrated in FIG. 8A (step S31). The consumption ratio setting screen 441 illustrated in FIG. 8A displays, for each of the groups, a consumption ratio 442 that expresses, in percentage, the corresponding consumption ratio received at step S27 (i.e., GROUP G1=1 or GROUP G2=0). The consumption ratio setting screen 441 also displays buttons 443 for receiving a change in the consumption ratio 442. The user C presses the buttons 443 to change the consumption ratio 442. FIG. 8B illustrates the consumption ratio setting screen 441 displayed after setting, specifically after the user C changes the respective consumption ratios of the group G1 and the group G2 from 100 and 0 to 60 and 40 by pressing the buttons 443 on the consumption ratio setting screen 441 illustrated in FIG. 8A. When the user C presses the buttons 443 and then an OK button 444, the receiving unit 42 of the image forming apparatus 4 receives the user-set consumption ratios (step S32). In changing of the consumption ratios, which is an example of setting of the consumption ratios, a user changes the consumption ratios previously set by the administrator to desired consumption ratios.

Then, the storing and reading unit 49 of the image forming apparatus 4 stores and manages the user-set consumption ratios (i.e., GROUP G1=0.6 and GROUP G2=0.4) received at step S32 in the storing unit 4000 (step S33).

The transmitting and receiving unit 41 of the image forming apparatus 4 then transmits the user ID (i.e., USER C) acquired at step S21 and the user-set consumption ratios (i.e., GROUP G1=0.6 and GROUP G2=0.4) received at step S32 to the usable amount management server 8 (step S34). Thereby, the transmitting and receiving unit 81 of the usable amount management server 8 receives the user ID (i.e., USER C) and the user-set consumption ratios (i.e., GROUP G1=0.6 and GROUP G2=0.4).

Then, the storing and reading unit 89 of the usable amount management server 8 stores and manages the user ID (i.e., USER C) and the user-set consumption ratios (i.e., GROUP G1=0.6 and GROUP G2=0.4) received at step S34 in the consumption ratio management DB 8002 such that the user ID and the user-set consumption ratios are associated with each other (step S35). At step S35, the user-set consumption ratios (i.e., GROUP G1=0.6 and GROUP G2=0.4) are stored in the consumption ratio management DB 8002 to overwrite the consumption ratios stored therein before step S35 (i.e., GROUP G1=1 and GROUP G2=0).

A process of managing the usable amounts based on the user-set consumption ratios received at step S32 will now be described with FIGS. 9 to 11.

Figure 9:
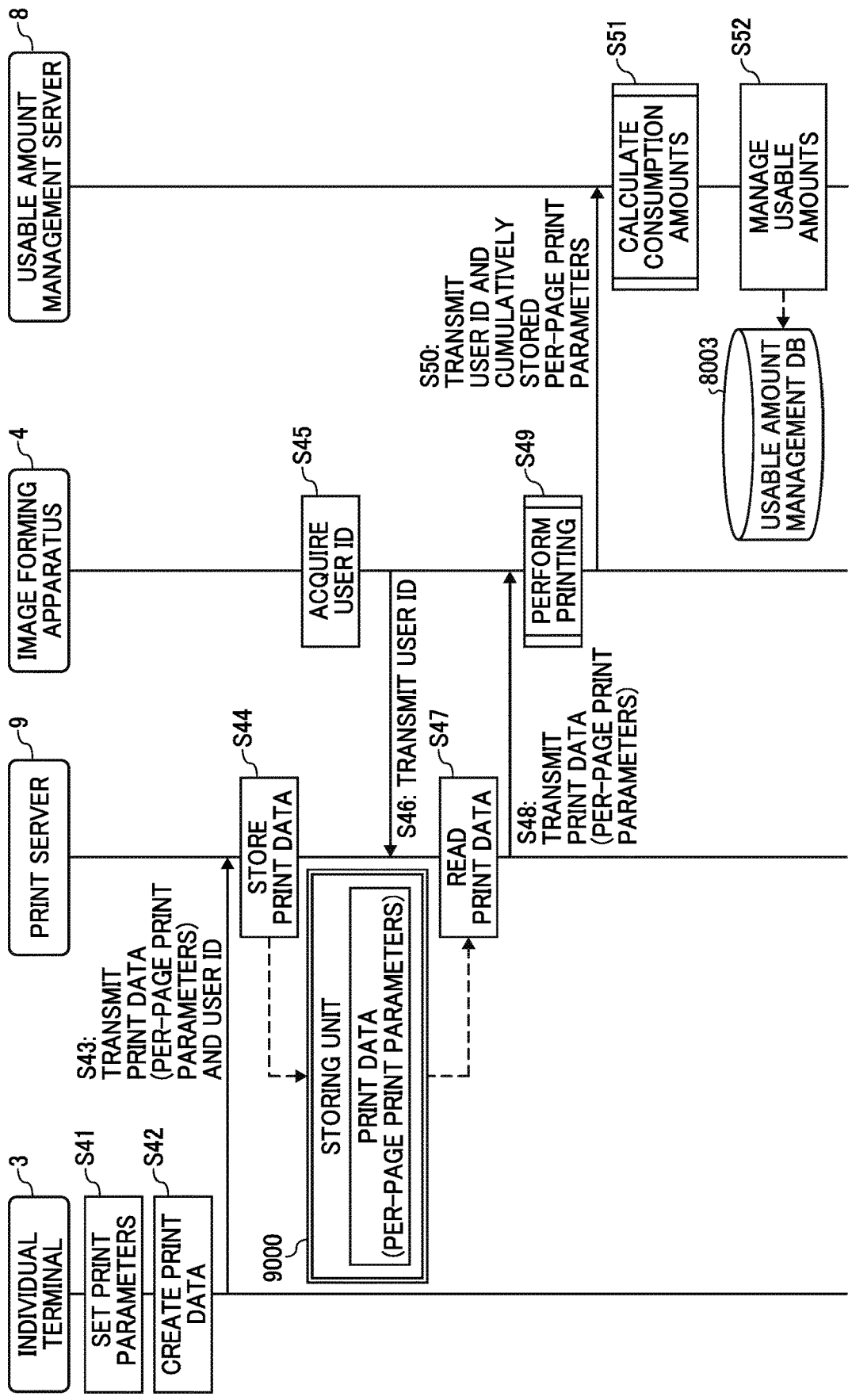
FIG. 9 is a sequence diagram illustrating a process of managing usable amounts in a printing operation according to the first embodiment.
Figure 10A:
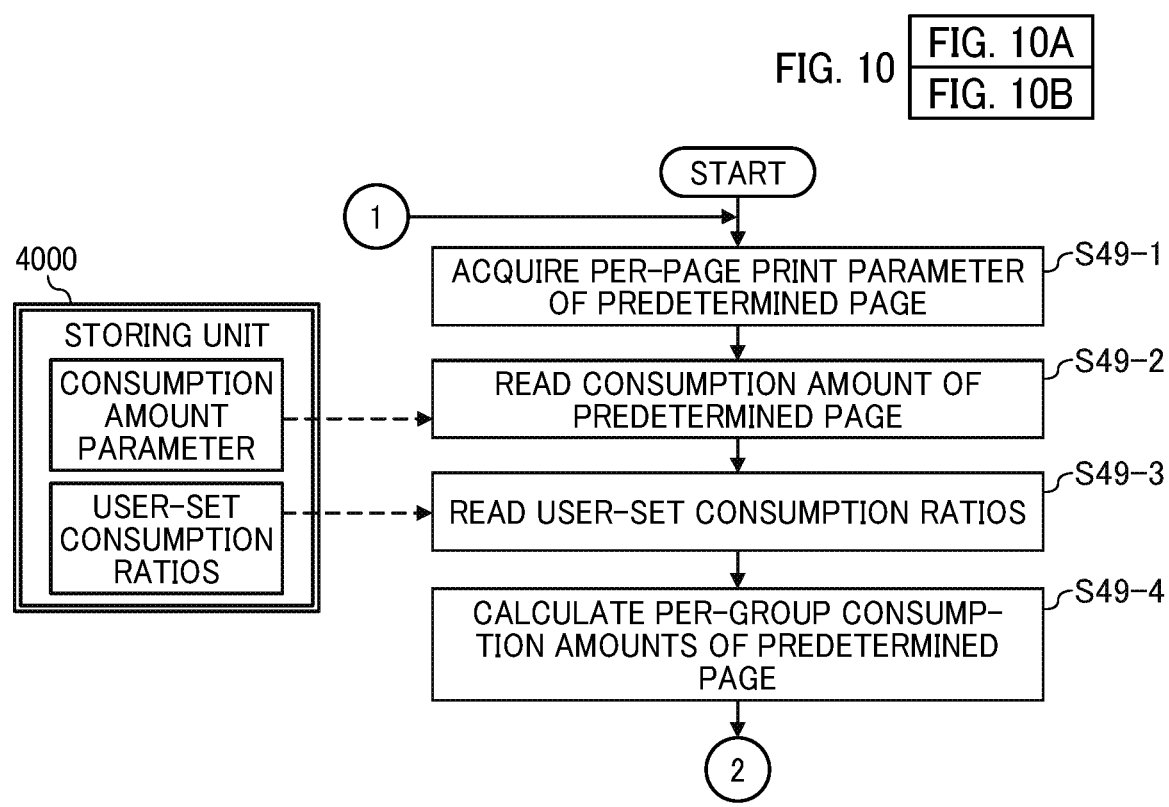
FIGS. 10A and 10B are a flowchart illustrating a process of determining whether printing is executable according to the first embodiment.
Figure 10B:
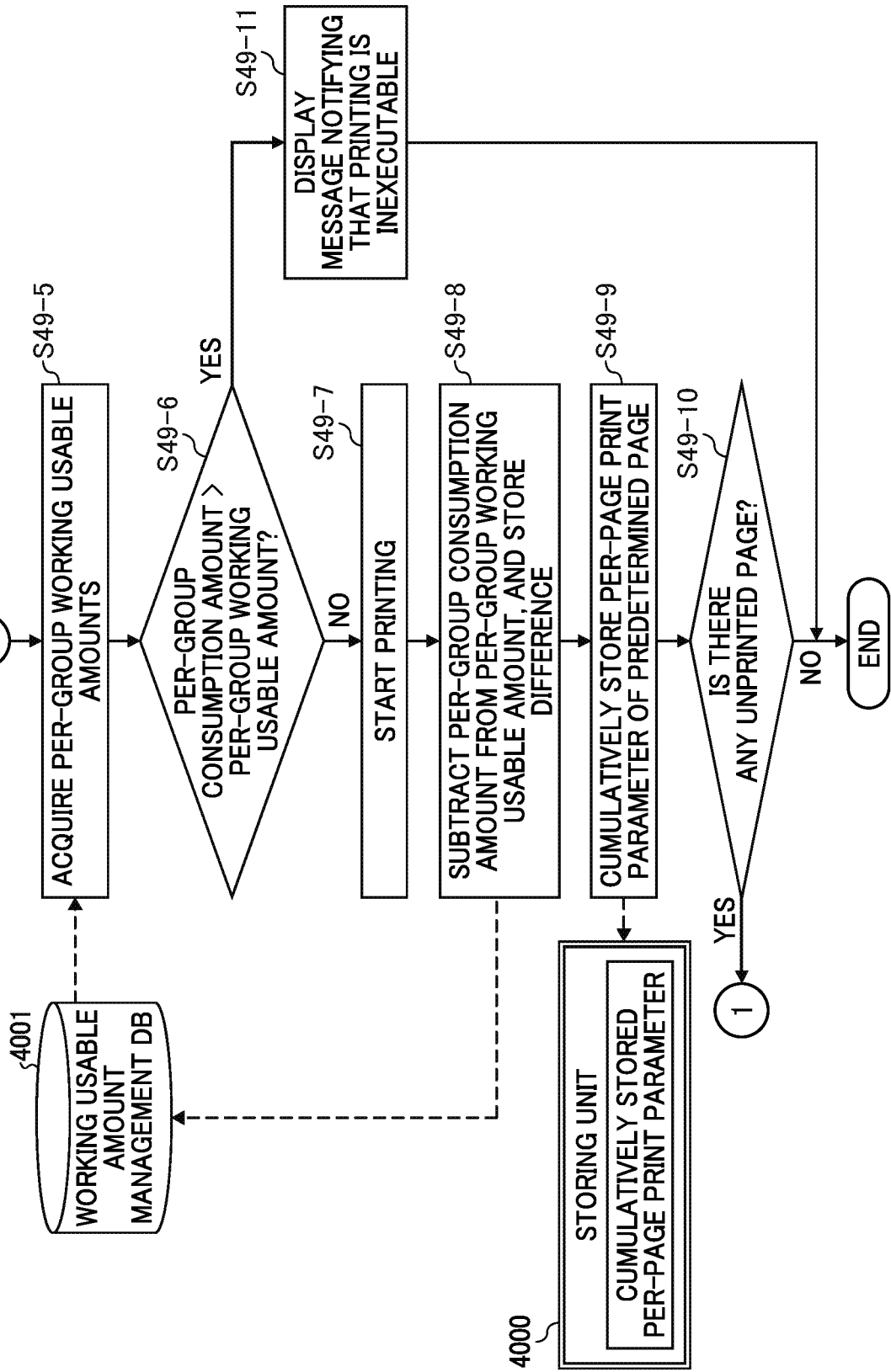

FIG. 9 is a sequence diagram illustrating a process of managing the usable amounts in a printing operation. FIGS. 10A and 10B are a flowchart illustrating a process of determining whether printing is executable. FIG. 11 is a flowchart illustrating a process of calculating the consumption amounts.

As illustrated in FIG. 9, the receiving unit 32 of the individual terminal 3 receives the print parameters set by the user C for document or image data to be printed (step S41). The following description will be given of processes performed when the user C sets MONOCHROME and DUPLEX as the print parameters for 4-page print content.

Based on the print parameters received at step S41, the creating unit 36 of the individual terminal 3 creates print data to be printed (step S42). The print data of each of the pages to be printed (i.e., each one-page print data item) includes the per-page print parameter including corresponding print parameters. That is, in this example, the print data of the first page includes MONOCHROME and FRONT SIDE as the per-page print parameter, and the print data of the second page includes MONOCHROME and BACK SIDE as the per-page print parameter. Similarly, the print data of the third page includes MONOCHROME and FRONT SIDE as the per-page print parameter, and the print data of the fourth page includes MONOCHROME and BACK SIDE as the per-page print parameter.

The transmitting and receiving unit 31 of the individual terminal 3 then transmits the print data with the per-page print parameters created at step S42 and the user ID (i.e., USER C) to the print server 9 (step S43). The user ID (i.e., USER C) to be transmitted to the print server 9 is read and acquired by the storing and reading unit 39 from the storing unit 3000, in which the user ID (i.e., USER C) of the user C is previously stored. Thereby, the transmitting and receiving unit 91 of the print server 9 receives the print data with the per-page print parameters and the user ID (i.e., USER C).

The storing and reading unit 99 of the print server 9 then stores and manages the print data with the per-page print parameters and the user ID (i.e., USER C) received at step S43 in the storing unit 9000 (step S44).

Then, the user C brings his or her IC card into proximity of the antenna 420a of the near field communication circuit 420 of the image forming apparatus 4 (i.e., when the user C holds the IC card over the antenna 420a), and the acquiring and providing unit 48 of the image forming apparatus 4 acquires the user ID (i.e., USER C) of the user C from the IC card (step S45). The transmitting and receiving unit 41 of the image forming apparatus 4 then transmits the user ID (i.e., USER C) received at step S45 to the print server 9 (step S46). Thereby, the transmitting and receiving unit 91 of the print server 9 receives the user ID (i.e., USER C).

The storing and reading unit 99 of the print server 9 then performs a process of extracting, from the storing unit 9000, the print data with the per-page print parameters associated with the user ID (i.e., USER C) received at step S46 (step S47). Then, the transmitting and receiving unit 91 transmits the print data with the per-page print parameters acquired at step S47 to the image forming apparatus 4 (step S48). Thereby, the transmitting and receiving unit 41 of the image forming apparatus 4 receives the print data with the per-page print parameters.

Then, the image forming apparatus 4 performs a process of printing based on the print data with the per-page print parameters (step S49).

The process of step S49 will now be described in detail with FIGS. 10A and 10B, which are a flowchart illustrating a process of determining whether printing is executable. The following usable amount management by the image forming apparatus 4 illustrated in FIGS. 10A and 10B will be referred to as the first usable amount management.

As illustrated in FIG. 10A, the acquiring unit 47 of the image forming apparatus 4 acquires the per-page print parameter of a predetermined page to be printed from the print data received at step S48 (step S49-1). For example, the acquiring unit 47 acquires the per-page print parameter included in the print data of the first page (i.e., MONOCHROME and FRONT SIDE). Then, using the per-page print parameter included in the print data of the first page acquired at step S49-1 (i.e., MONOCHROME and FRONT SIDE) as a search key, the storing and reading unit 49 searches through the consumption amount parameter stored in the storing unit 4000 at step S28, to thereby read the corresponding consumption amount (step S49-2). The per-page print parameter of the first embodiment corresponds to print parameters provided to each one-page print data item. The per-page print parameter includes a print parameter related to printing of one page (e.g., a parameter indicating printing on the front or back side of a sheet), but does not include a print parameter related to printing of a plurality of pages (e.g., a parameter indicating duplex printing). In the first embodiment, therefore, in place of the per-page print parameter acquired at step S49-1 (i.e., MONOCHROME and FRONT SIDE), the storing and reading unit 49 uses a per-page print parameter assuming simplex printing (i.e., MONOCHROME SIMPLEX PRINTING) as a search key to search through the consumption amount parameter stored in the storing unit 4000 at step S28 (see the consumption amount management table T6 in FIG. 5F). Thereby, the storing and reading unit 49 reads 2 as the corresponding consumption amount (i.e., MONOCHROME SIMPLEX PRINTING=2).

Then, the storing and reading unit 49 of the image forming apparatus 4 reads the user-set consumption ratios (i.e., GROUP G1=0.6 and GROUP G2=0.4) stored in the storing unit 4000 at step S33 (step S49-3). Then, based on the user-set consumption ratios (i.e., GROUP G1=0.6 and GROUP G2=0.4) read at step S49-3, the calculating unit 50 of the image forming apparatus 4 calculates GROUP G1=1.2 and GROUP G2=0.8 as the per-group consumption amounts to the consumption amount of 2 read at step S49-2 (step S49-4). Specifically, the calculating unit 50 multiplies the respective user-set consumption ratios of the groups (i.e., GROUP G1=0.6 and GROUP G2=0.4) by the consumption amount of 2 to calculate the per-group consumption amounts (i.e., GROUP G1=1.2 and GROUP G2=0.8). Herein, the per-group consumption amount is an example of the consumption amount.

Then, the storing and reading unit 49 of the image forming apparatus 4 performs a search through the working usable amount management DB 4001 by using the group Ds (i.e., GROUP G1 and GROUP G2) received at step S27 as a search key, to thereby read 150 (i.e., the working usable amount of the group G1) and 200 (i.e., the working usable amount of the group G2) stored at step S29 as the respective working usable amounts corresponding to the group IDs (step S49-5).

Then, the determining unit 45 of the image forming apparatus 4 determines, for each of the groups, whether the consumption amount calculated at step S49-4 is greater than the working usable amount read at step S49-5 (step S49-6). If the determining unit 45 determines, for each of the groups, that the consumption amount calculated at step S49-4 is not greater than the working usable amount read at step S49-5 (NO at step S49-6), the printing unit 43 prints the predetermined page (i.e., the first page in the present example) (step S49-7). After the printing at step S49-7, the storing and reading unit 49 of the image forming apparatus 4 stores and manages the group IDs (i.e., GROUP G1 and GROUP G2) and post-printing working usable amounts corresponding thereto (i.e., 148.8 as the post-printing working usable amount of the group G1 and 199.2 as the post-printing working usable amount of the group G2) in the working usable amount management DB 4001 (i.e., the working usable amount management table T1 in FIG. 5A) such that the group IDs and the post-printing working usable amounts are associated with each other (step S49-8). The post-printing working usable amounts (i.e., 148.8 as the post-printing working usable amount of the group G1 and 199.2 as the post-printing working usable amount of the group G2) are obtained by subtracting the consumption amounts calculated at step S49-4 (i.e., GROUP G1=1.2 and GROUP G2=0.8) from the pre-printing working usable amounts (i.e., 150 as the pre-printing working usable amount of the group G1 and 200 as the pre-printing working usable amount of the group G2), respectively. At step S49-8, the post-printing working usable amounts (i.e., 148.8 as the post-printing working usable amount of the group G1 and 199.2 as the post-printing working usable amount of the group G2) are stored in the working usable amount management DB 4001 to overwrite the pre-printing working usable amounts (i.e., 150 as the pre-printing working usable amount of the group G1 and 200 as the pre-printing working usable amount of the group G2) stored therein before the printing at step S49-7. The storing and reading unit 49 of the image forming apparatus 4 then cumulatively stores and manages the per-page print parameter acquired at step S49-1 (i.e., MONOCHROME and FRONT SIDE) in the storing unit 4000 (step S49-9). Specifically, the per-page print parameters of the respective pages included in predetermined print data are successively stored at step S49-9. For example, when the per-page print parameter of the first page is stored in the storing unit 4000 as MONOCHROME and FRONT SIDE, the per-page print parameter of the second page is successively stored in the storing unit 4000 as MONOCHROME and FRONT SIDE and MONOCHROME and BACK SIDE. In the first embodiment, the per-page print parameters cumulatively stored in the storing unit 4000 will be referred to as the cumulatively stored per-page print parameters.

Then, the determining unit 45 of the image forming apparatus 4 determines whether any of the pages of the print data received at step S48 is unprinted (step S49-10). If the determining unit 45 determines that the print data includes an unprinted page (YES at step S49-10), the procedure returns to step S49-1 described above to start the processes of step S49-1 and the subsequent steps on the unprinted page. If the determining unit 45 determines that the print data does not include an unprinted page (NO at step S49-10), the procedure proceeds to the process of step S50.

It is determined in the present example that it is possible to print all of the four pages, and the storing and reading unit 49 stores and manages post-printing working usable amounts (i.e., 145.2 as the post-printing working usable amount of the group G1 and 196.8 as the post-printing working usable amount of the group G2) in the working usable amount management DB 4001. The post-printing working usable amounts (i.e., 145.2 as the post-printing working usable amount of the group G1 and 196.8 as the post-printing working usable amount of the group G2) are obtained by subtracting respective consumption amounts corresponding to the four pages from the pre-printing working usable amounts (i.e., 150 as the pre-printing working usable amount of the group G1 and 200 as the pre-printing working usable amount of the group G2). The storing and reading unit 49 further stores and manages the cumulatively stored per-page print parameters (i.e., MONOCHROME and FRONT SIDE, MONOCHROME and BACK SIDE, MONOCHROME and FRONT SIDE, and MONOCHROME and BACK SIDE) in the storing unit 4000. If the determining unit 45 of the image forming apparatus 4 determines, for any of the groups, that the consumption amount calculated at step S49-4 is greater than the working usable amount read at step S49-5 (YES at step S49-6), the display control unit 44 of the image forming apparatus 4 displays, on the display 440a, a screen notifying that printing is inexecutable (step S49-11). Then, the procedure proceeds to the process of step S50.

Referring back to FIG. 9, the transmitting and receiving unit 41 of the image forming apparatus 4 transmits the user ID (i.e., USER C) acquired at step S45 and the cumulatively stored per-page print parameters (i.e., MONOCHROME and FRONT SIDE, MONOCHROME and BACK SIDE, MONOCHROME and FRONT SIDE, and MONOCHROME and BACK SIDE) stored and managed at step S49-9 to the usable amount management server 8 (step S50). Thereby, the transmitting and receiving unit 81 of the usable amount management server 8 receives the user ID and the cumulatively stored per-page print parameters.

Then, the usable amount management server 8 performs a process of calculating the consumption amounts based on the cumulatively stored per-page print parameters (step S51).

The process of step S51 will now be described in detail with FIG. 11, which is a flowchart illustrating a process of calculating the consumption amounts. The following usable amount management by the usable amount management server 8 illustrated in FIG. 11 will be referred to as the second usable amount management.

Figure 11:
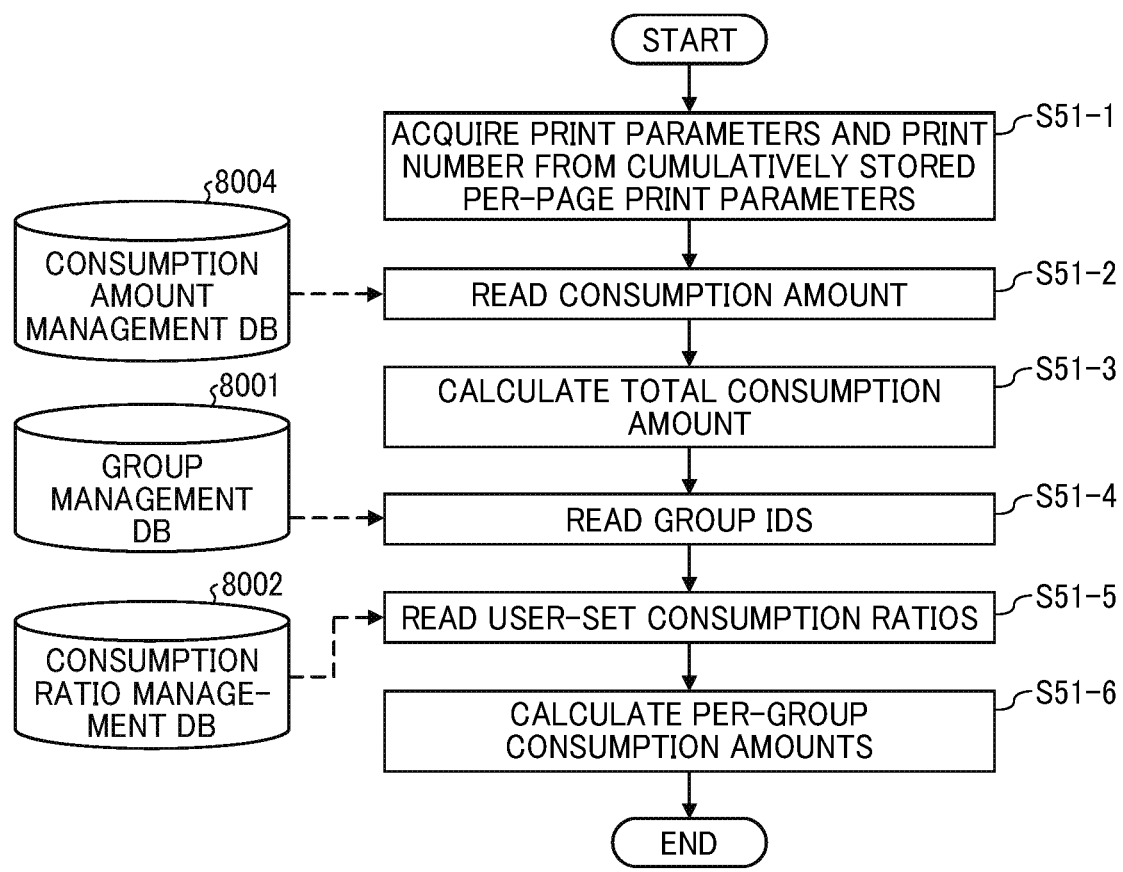
FIG. 11 is a flowchart illustrating a process of calculating consumption amounts according to the first embodiment.

As illustrated in FIG. 11, the acquiring unit 84 of the usable amount management server 8 acquires a print parameter (i.e., MONOCHROME DUPLEX) and a print number of 2 from the cumulatively stored per-page print parameters (i.e., MONOCHROME and FRONT SIDE, MONOCHROME and BACK SIDE, MONOCHROME and FRONT SIDE, and MONOCHROME and BACK SIDE) received at step S50 (step S51-1). Specifically, the acquiring unit 84 acquires a print parameter related to monochrome printing or color printing from information of monochrome printing or color printing included in the cumulatively stored per-page print parameters. Further, if information of the print side included in the cumulatively stored per-page print parameters represents a sequence of FRONT SIDE and FRONT SIDE, the acquiring unit 84 determines that the print parameter includes simplex printing, and acquires a print parameter related to simplex printing. If the information of the print side included in the cumulatively stored per-page print parameters represents a sequence of FRONT SIDE and BACK SIDE, the acquiring unit 84 determines that the print parameter includes duplex printing, and acquires a print parameter related to duplex printing. Further, if having determined that the print parameter includes simplex printing, the acquiring unit 84 determines the print number as the number of cumulative per-page print parameters, and acquires the print number based on the determination. If having determined that the print parameter includes duplex printing and that the number of cumulative per-page print parameters is an even number, the acquiring unit 84 determines the print number as half the number of cumulative per-page print parameters, and acquires the print number based on the determination. If having determined that the print parameter includes duplex printing and that the number of cumulative per-page print parameters is an odd number, the acquiring unit 84 determines that the print number is obtainable by adding one to the number of cumulative per-page print parameters and then halving the resultant number, and acquires the print number based on the determination. The print number refers to the number of print materials, and is distinguished from the number of pages of the print data. For example, when print data having two pages is duplex-printed, the print number is one.

Then, the storing and reading unit 89 of the usable amount management server 8 performs a search through the consumption amount management DB 8004 by using the user ID (i.e., USER C) received at step S50 as a search key, to thereby read the corresponding consumption amount parameter (i.e., MONOCHROME SIMPLEX PRINTING=2, MONOCHROME DUPLEX PRINTING=3, COLOR SIMPLEX PRINTING=6, COLOR DUPLEX PRINTING=9). The storing and reading unit 89 further searches through the read consumption amount parameter (i.e., MONOCHROME SIMPLEX PRINTING=2, MONOCHROME DUPLEX PRINTING=3, COLOR SIMPLEX PRINTING=6, COLOR DUPLEX PRINTING=9) by using the print parameter (i.e., MONOCHROME DUPLEX PRINTING) acquired at step S51-1 as a search key, to thereby read 3 as the corresponding consumption amount (step S51-2).

Then, the calculating unit 83 of the usable amount management server 8 calculates a total consumption amount of 6 based on the print number of 2 acquired at step S51-1 and the consumption amount of 3 read at step S51-2 (step S51-3). Specifically, the calculating unit 83 multiplies the print number of 2 by the consumption amount of 3 to calculate the total consumption amount of 6.

The storing and reading unit 89 of the usable amount management server 8 then performs a search through the group management DB 8001 by using the user ID (i.e., USER C) received at step S50 as a search key, to thereby read the corresponding group IDs (i.e., GROUP G1 and GROUP G2) (step S51-4).

The storing and reading unit 89 of the usable amount management server 8 then performs a search through the consumption ratio management DB 8002 by using the user ID (i.e., USER C) received at step S50 as a search key, to thereby read the corresponding user-set consumption ratios (i.e., GROUP G1=0.6 and GROUP G2=0.4) stored and managed at step S35 (step S51-5).

Then, based on the total consumption amount of 6 calculated at step S51-3 and the user-set consumption ratios (i.e., GROUP G1=0.6 and GROUP G2=0.4) read at step S51-5, the calculating unit 83 of the usable amount management server 8 calculates the respective consumption amounts of the groups (i.e., GROUP G1=3.6 and GROUP G2=2.4) (step S51-6). Then, the procedure proceeds to the process of step S52. Specifically, the calculating unit 83 multiplies the respective user-set consumption ratios of the groups (i.e., GROUP G1=0.6 and GROUP G2=0.4) by the total consumption amount of 6 to calculate the respective consumption amounts of the groups (i.e., GROUP G1=3.6 and GROUP G2=2.4).

Referring back to FIG. 9, the storing and reading unit 89 of the usable amount management server 8 stores and manages the group IDs (i.e., GROUP G1 and GROUP G2) and post-printing usable amounts corresponding thereto (i.e., 146.4 as the post-printing usable amount of the group G1 and 197.6 as the post-printing usable amount of the group G2) in the usable amount management DB 8003 such that the group IDs and the post-printing usable amounts are associated with each other (step S52). The post-printing usable amounts (i.e., 146.4 as the post-printing usable amount of the group G1 and 197.6 as the post-printing usable amount of the group G2) are obtained by subtracting the consumption amounts calculated at step S51-6 (i.e., GROUP G1=3.6 and GROUP G2=2.4) from the pre-printing usable amounts (i.e., 150 as the pre-printing usable amount of the group G1 and 200 as the pre-printing usable amount of the group G2), respectively. At step S52, the post-printing usable amounts (i.e., 146.4 as the post-printing usable amount of the group G1 and 197.6 as the post-printing usable amount of the group G2) are stored in the usable amount management DB 8003 to overwrite the pre-printing usable amounts (i.e., 150 as the pre-printing usable amount of the group G1 and 200 as the pre-printing usable amount of the group G2) stored therein before step S52.

As described above, when a user belonging to a plurality of attributes desires to change the ratios of the consumption amounts of the attributes depending on a difference in print content, for example, the first embodiment enables flexible allocation of consumption amounts, allowing the user to allocate the consumption amounts to the attributes.

Further, the display control unit 44 of the image forming apparatus 4 displays the consumption ratio setting screen 441 on the display 440a based on the screen data at step S31. The consumption ratio setting screen 441 displays the consumption ratio 442 for each of the groups and the buttons 443 for receiving the change in the consumption ratio 442, as illustrated in FIGS. 8A and 8B. Thereby, the user C belonging to the plurality of groups is capable of changing the consumption ratio 442 by pressing the buttons 443, and thus capable of flexibly allocating the consumption amounts to the groups even if the contribution ratios of the user C to the groups vary depending on the print content. Further, the user C is capable of performing desired detailed settings of the consumption ratios of the groups to which the user C belongs, without intermediation by the administrator.

Further, at step S49-4, the calculating unit 50 of the image forming apparatus 4 calculates the per-group consumption amounts to the consumption amount. Then, at step S49-5, the storing and reading unit 49 of the image forming apparatus 4 reads the respective working usable amounts of the groups. Thereafter, at step S49-6, the determining unit 45 of the image forming apparatus 4 determines whether each of the per-group consumption amounts is greater than the corresponding working usable amount. If the determining unit 45 determines that the per-group consumption amount is not greater than the working usable amount, the printing unit 43 of the image forming apparatus 4 prints a corresponding predetermined page at step S49-7. Thereby, the image forming apparatus 4 is capable of performing the usable amount management with no need to inquire of the usable amount management server 8 about whether printing is executable in each printing operation.

As described above, in the first embodiment, the per-page print parameter does not include a print parameter covering a plurality of pages (e.g., the information of simplex printing or duplex printing). This results in differences between the post-printing working usable amounts managed by the image forming apparatus 4 (e.g., 145.2 as the post-printing working usable amount of the group G1 and 196.8 as the post-printing working usable amount of the group G2) and the post-printing usable amounts managed by the usable amount management server 8 (e.g., 146.4 as the post-printing usable amount of the group G1 and 197.6 as the post-printing usable amount of the group G2). To prevent the actual usable amounts managed by the usable amount management server 8 from having a negative value, therefore, it is preferable that the consumption amount for two pages of print data in simplex printing is greater than the consumption amount for one page of print data in duplex printing. In the present invention, the print parameters may be added to the per-page print parameter for each of the pages of the print data such that the post-printing working usable amounts managed by the image forming apparatus 4 match the post-printing usable amounts managed by the usable amount management server 8.

A second embodiment of the present invention will now be described with FIG. 12.

Figure 12:
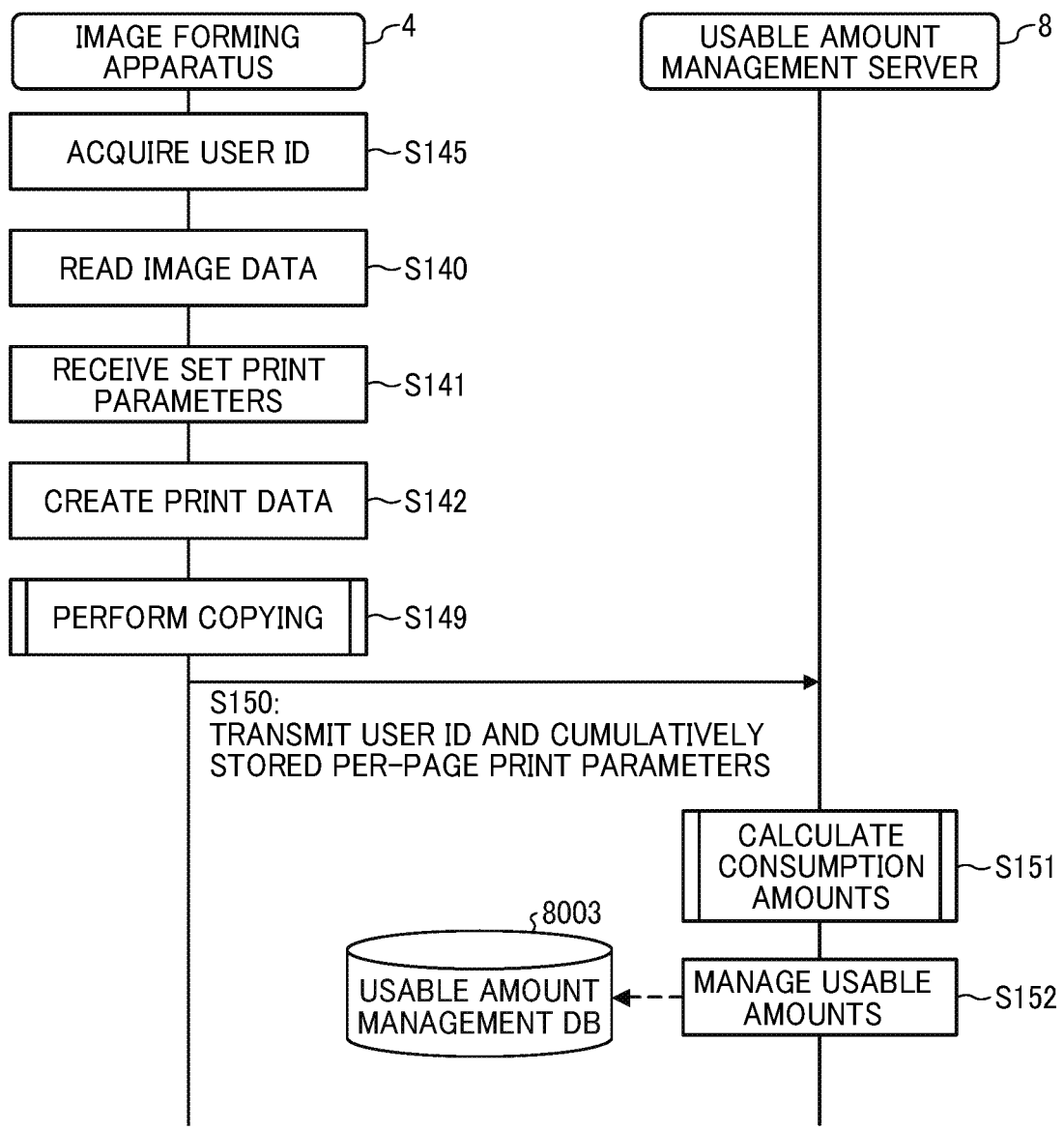
FIG. 12 is a sequence diagram illustrating a process of managing the usable amounts in a copying operation according to a second embodiment of the present invention.

FIG. 12 is a sequence diagram illustrating a process of managing the usable amounts in a copying operation. Terminals, an apparatus, and servers of the second embodiment are similar in hardware configuration and functional configuration to those of the first embodiment, and thus description thereof will be omitted.

Processes or operations of the second embodiment will be described below.

It is assumed here that the user C belonging to both the group G1 and the group G2 may make a copy of print content related only to business of the group G1 or may make a copy of print content related to business covered by both the group G1 and the group G2. That is, the contribution ratio of the user C to the group G1 and the contribution ratio of the user C to the group G2 vary depending on which of the two types of print content is copied. It is also assumed that, when the user C makes a copy of print content related only to business of the group G1, the user C desires the consumption ratio of the group G1 and the consumption ratio of the group G2 to be set as 100% and 0%, respectively, to be used in the management of the usable amounts. It is further assumed that, when the user C makes a copy of print content related to business covered by both the group G1 and the group G2, the user C desires the consumption ratio of the group G1 and the consumption ratio of the group G2 to be set as 60% and 40%, respectively, to be used in the management of the usable amounts. It is also assumed that the consumption ratios of the user C initially set by the administrator with the administrator terminal 2 are 100% for the group G1 and 0% for the group G2. The following description will be given of processes or operations performed in this case when the user C makes a copy of print content related to business covered by both the group G1 and the group G2, and desires the consumption ratios to be changed to 60% for the group G1 and 40% for the group G2 to be used in the management of the usable amounts. Herein, copying is an example of printing. A consumption ratio setting process of the second embodiment is similar to that of the first embodiment, and thus description thereof will be omitted. The following description will be given of a usable amount management process of the second embodiment.

A process of managing the usable amounts based on the user-set consumption ratios received at a step similar to step S32 of the first embodiment will be described with FIG. 12, which is a sequence diagram illustrating a process of managing the usable amounts in a copying operation.

As illustrated in FIG. 12, when the user C brings his or her IC card into proximity of the antenna 420a of the near field communication circuit 420 of the image forming apparatus 4 (i.e., when the user C holds the IC card over the antenna 420a), the acquiring and providing unit 48 of the image forming apparatus 4 acquires the user ID (i.e., USER C) of the user C from the IC card (step S145).

The image reading unit 51 of the image forming apparatus 4 then reads a document or image to be copied, for example, to thereby acquire document or image data (step S140).

Then, the receiving unit 42 of the image forming apparatus 4 receives the print parameters set by the user C for the document or image data read at step S140 (step S141). The process of step S141 is similar to that of step S41 of the first embodiment, and thus description thereof will be omitted.

The creating unit 46 of the image forming apparatus 4 then creates print data to be copied based on the print parameters received at step S141 (step S142). The process of step S142 is similar to that of step S42 of the first embodiment, and thus description thereof will be omitted.

Then, the image forming apparatus 4 performs a process of copying based on the print data including the per-page print parameters (step S149). The process of step S149 is similar to that of step S49 of the first embodiment, and thus description thereof will be omitted.

The transmitting and receiving unit 41 of the image forming apparatus 4 then transmits, to the usable amount management server 8, the user ID (i.e., USER C) acquired at step S145 and the cumulatively stored per-page print parameters (i.e., MONOCHROME and FRONT SIDE, MONOCHROME and BACK SIDE, MONOCHROME and FRONT SIDE, and MONOCHROME and BACK SIDE) stored and managed at a step similar to step S49-9 of the first embodiment (step S150). Thereby, the transmitting and receiving unit 81 of the usable amount management server 8 receives the user ID and the cumulatively stored per-page print parameters.

Then, the usable amount management server 8 performs a process of calculating the consumption amounts based on the cumulatively stored per-page print parameters (step S151). The process of step S151 is similar to that of step S51 of the first embodiment, and thus description thereof will be omitted.

The storing and reading unit 89 of the usable amount management server 8 then stores and manages the group IDs (i.e., GROUP G1 and GROUP G2) and post-printing usable amounts corresponding thereto (i.e., 146.4 as the post-printing usable amount of the group G1 and 197.6 as the post-printing usable amount of the group G2) in the usable amount management DB 8003 such that the group IDs and the post-printing usable amounts are associated with each other (step S152). The post-printing usable amounts (i.e., 146.4 as the post-printing usable amount of the group G1 and 197.6 as the post-printing usable amount of the group G2) are obtained by subtracting consumption amounts calculated at a step similar to step S51-6 of the first embodiment (i.e., GROUP G1=3.6 and GROUP G2=2.4) from the pre-printing usable amounts (i.e., 150 as the pre-printing usable amount of the group G1 and 200 as the pre-printing usable amount of the group G2), respectively. At step S152, the above-described information is stored in the usable amount management DB 8003 to overwrite the information stored therein before step S152.

As described above, according to the second embodiment, it is possible to flexibly allocate the consumption amounts similarly as in the first embodiment.

Further, similarly as in the first embodiment, the image forming apparatus 4 is capable of performing the usable amount management with no need to inquire of the usable amount management server 8 about whether copying is executable in each copying operation.

A third embodiment of the present invention will now be described with FIGS. 13 to 17.

Figure 14:
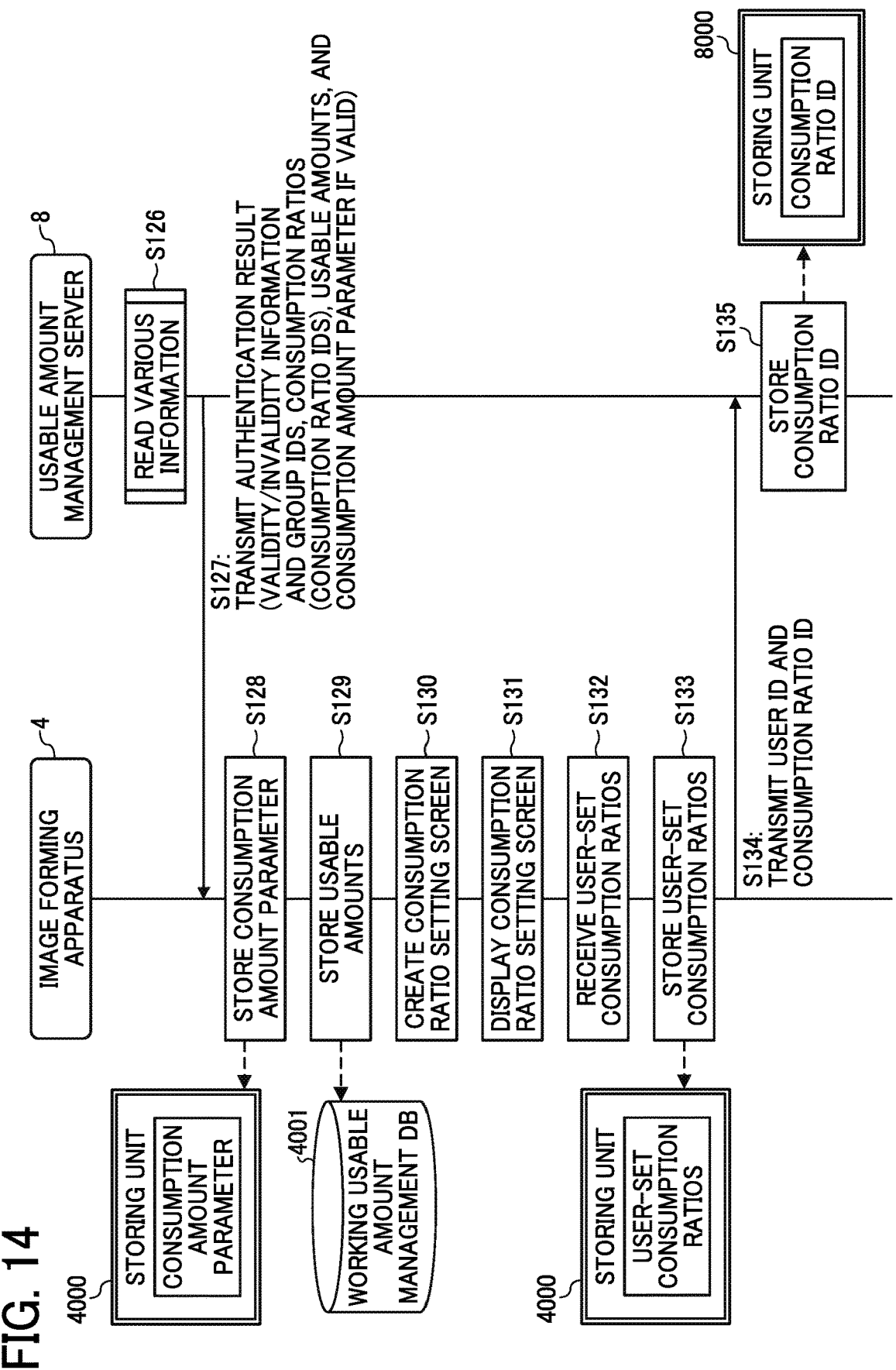
FIG. 14 is a sequence diagram illustrating a process of setting the consumption ratios according to the third embodiment.
Figure 15:
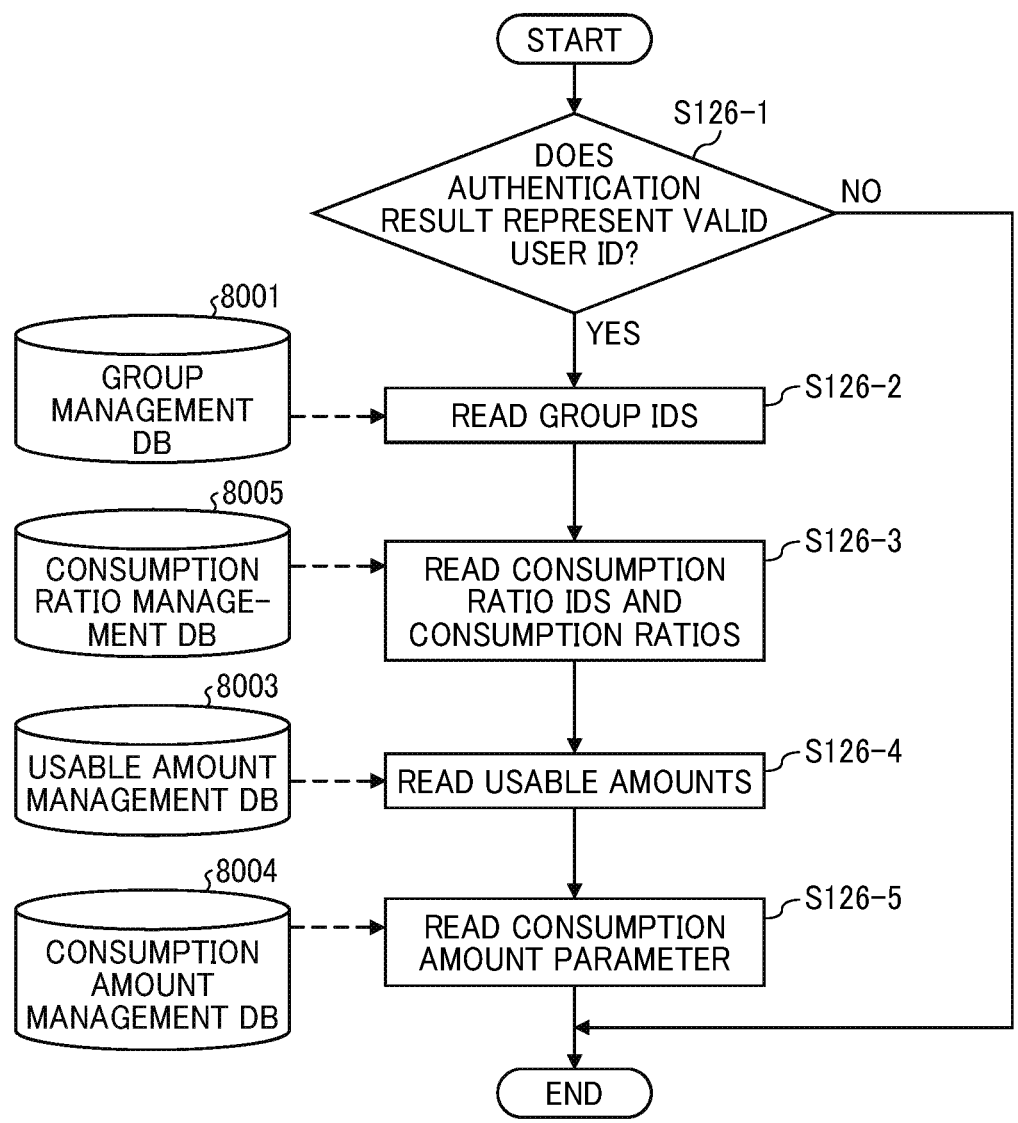
FIG. 15 is a flowchart illustrating a process of reading a variety of information for setting the consumption ratios according to the third embodiment.
Figure 16A:
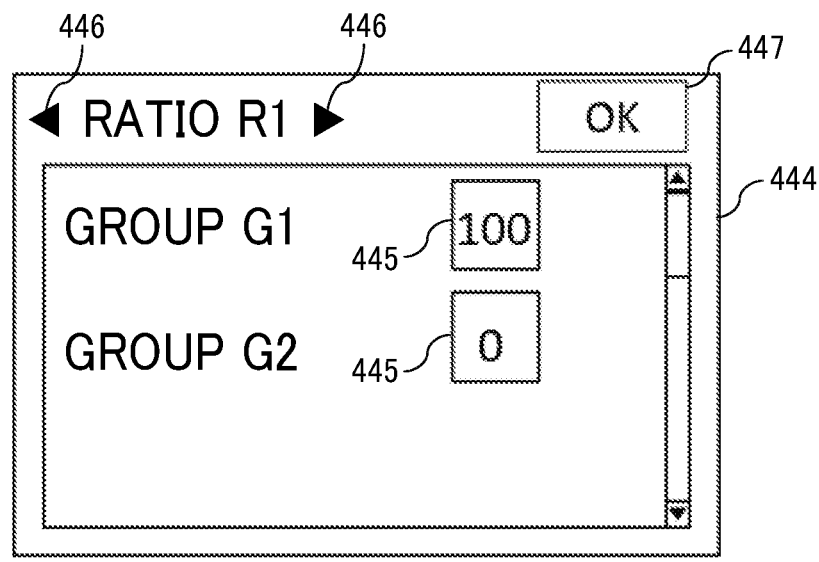
FIGS. 16A and 16B are diagrams illustrating an exemplary screen displayed on the display of the image forming apparatus according to the third embodiment.
Figure 16B:
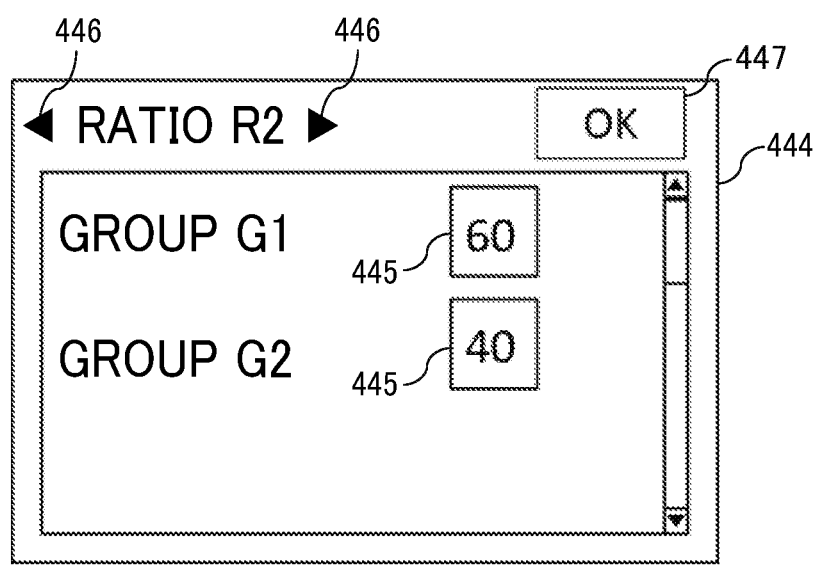
Figure 17:
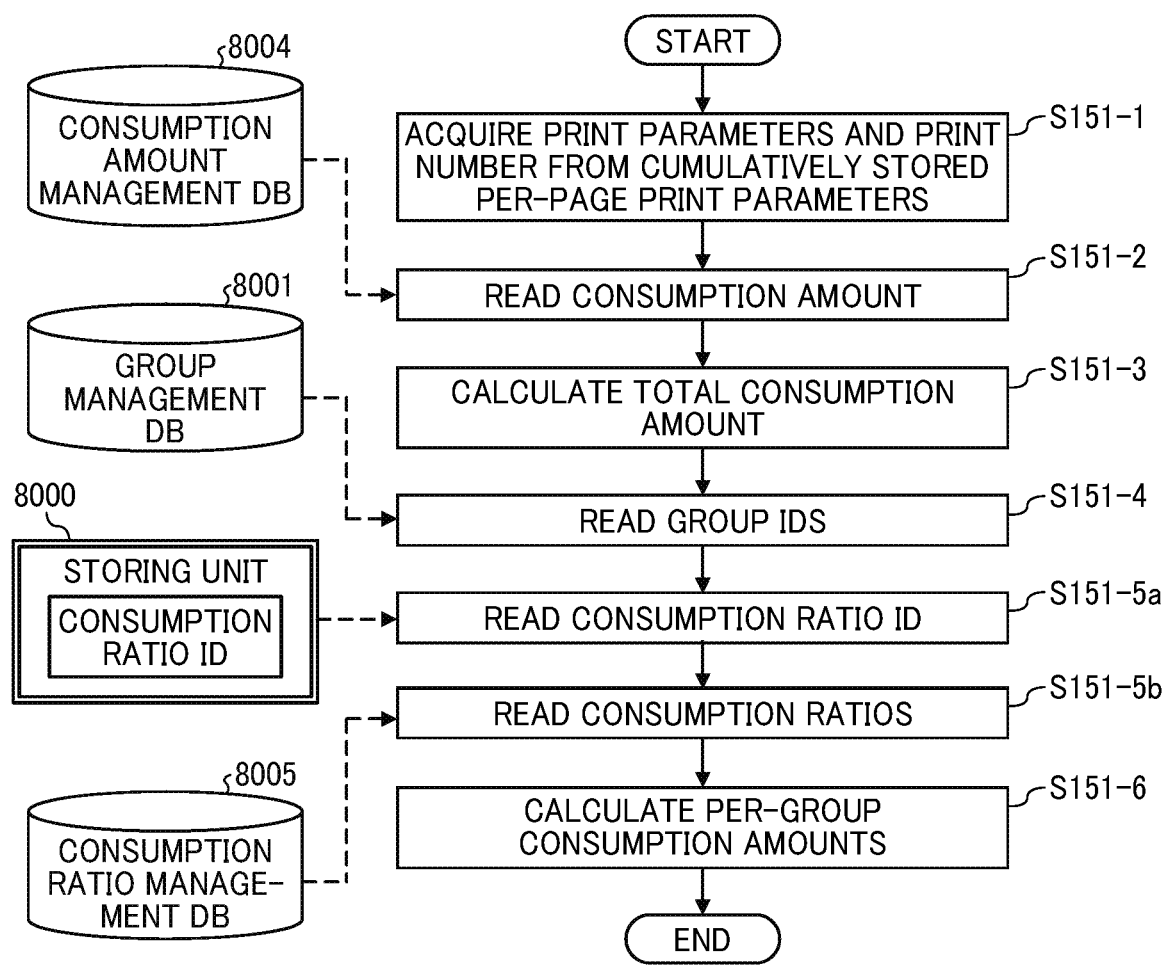
FIG. 17 is a flowchart illustrating a process of calculating the consumption amounts according to the third embodiment.

FIG. 13 is a conceptual diagram illustrating a consumption ratio management table. FIG. 14 is a sequence diagram illustrating a process of setting the consumption ratios. FIG. 15 is a flowchart illustrating a process of reading a variety of information for setting the consumption ratios. FIGS. 16A and 16B are diagrams illustrating an exemplary screen displayed on the display 440a of the image forming apparatus 4. FIG. 17 is a flowchart illustrating a process of calculating the consumption amounts. Terminals, an apparatus, and servers of the third embodiment are similar in hardware configuration to those of the first embodiment, and thus description thereof will be omitted.

The administrator terminal 2, the individual terminal 3, the image forming apparatus 4, the authentication management server 6, and the print server 9 of the usable amount managing system 10 in the third embodiment are similar in functional configuration to those of the first embodiment, and thus description thereof will be omitted. Further, the usable amount management server 8 of the third embodiment is similar in functional configuration to that of the first embodiment except for the absence of the consumption ratio management DB 8002 of the first embodiment configured as the consumption ratio management table T4 illustrated in FIG. 5D. Thus, description of similarities in functional configuration of the third embodiment to the first embodiment will be omitted, and the following description will be given of differences in functional configuration of the third embodiment from the first embodiment.

The usable amount management server 8 of the third embodiment uses a consumption ratio management DB 8005 configured as a consumption ratio management table T7 illustrated in FIG. 13, in place of the consumption ratio management DB 8002 of the first embodiment configured as the consumption ratio management table T4 illustrated in FIG. 5D.

FIG. 13 is a conceptual diagram illustrating the consumption ratio management table T7. The storing unit 8000 includes the consumption ratio management DB 8005 configured as the consumption ratio management table T7 illustrated in FIG. 13. In the consumption ratio management table T7, the consumption ratio, i.e., the ratio of the per-group consumption amount to the consumption amount consumed by image formation executed by the user, and a consumption ratio ID for identifying the consumption ratio are managed in association with the user ID.

Processes or operations of the third embodiment will be described below.

It is assumed here that the user C belonging to both the group G1 and the group G2 may make a print of print content related only to business of the group G1 or may make a print of print content related to business covered by both the group G1 and the group G2. That is, the contribution ratio of the user C to the group G1 and the contribution ratio of the user C to the group G2 vary depending on which of the two types of print content is printed. It is also assumed that, when the user C makes a print of print content related only to business of the group G1, the user C desires the consumption ratio of the group G1 and the consumption ratio of the group G2 to be set as 100% and 0%, respectively, to be used in the management of the usable amounts. It is further assumed that, when the user C makes a print of print content related to business covered by both the group G1 and the group G2, the user C desires the consumption ratio of the group G1 and the consumption ratio of the group G2 to be set as 60% and 40%, respectively, to be used in the management of the usable amounts. It is also assumed that there are two patterns of consumption ratios of the user C initially set by the administrator with the administrator terminal 2: 100% for the group G1 and 0% for the group G2, and 60% for the group G1 and 40% for the group G2. The following description will be given of processes or operations performed in this case when the user C makes a print of print content related to business covered by both the group G1 and the group G2, and desires to select the consumption ratio of 60% for the group G1 and the consumption ratio of 40% for the group G2 to be used in the management of the usable amounts.

A process of setting the consumption ratios performed on the image forming apparatus 4 by the user C will first be described with FIGS. 14 to 16B.

FIG. 14 is a sequence diagram illustrating a process of setting the consumption ratios. FIG. 15 is a flowchart illustrating a process of reading a variety of information for setting the consumption ratios. FIGS. 16A and 16B are diagrams illustrating an exemplary screen displayed on the display 440a of the image forming apparatus 4. The consumption ratio setting process of the third embodiment includes processes similar to those of steps S21 to S25 of the first embodiment, and thus description of those processes will be omitted.

FIG. 14 illustrates steps following a step similar in process to step S25. As illustrated in FIG. 14, the usable amount management server 8 performs a process of reading a variety of information for setting the consumption ratios based on the authentication result (step S126).

The process of step S126 will now be described in detail with FIG. 15, which is a flowchart illustrating a process of reading a variety of information for setting the consumption ratios.

As illustrated in FIG. 15, the determining unit 82 of the usable amount management server 8 determines whether the authentication result received at the step similar to step S25 includes the information indicating that the IC card is valid, i.e., whether the user ID acquired through a process similar to that of step S21 of the first embodiment is valid (step S126-1). If the determining unit 82 determines at step S126-1 that the authentication result includes the information indicating that the user ID is valid, i.e., if the determining unit 82 determines a login success (YES at step S126-1), the storing and reading unit 89 performs a search through the group management DB 8001 (i.e., the group management table T3 in FIG. 5C) by using the user ID (i.e., USER C) received through a process similar to that of step S22 of the first embodiment as a search key, to thereby read GROUP G1 and GROUP G2 as the corresponding group IDs (step S126-2). The storing and reading unit 89 then performs a search through the consumption ratio management DB 8005 (i.e., the consumption ratio management table T7 in FIG. 13) by using the user ID (i.e., USER C) received through the process similar to that of step S22 of the first embodiment as a search key. Thereby, the storing and reading unit 89 reads corresponding consumption ratio IDs RATIO R3-1 and RATIO R3-2 and corresponding consumption ratios GROUP G1=1 and GROUP G2=0 (i.e., consumption ratios corresponding to RATIO R3-1) and GROUP G1=0.6 and GROUP G2=0.4 (i.e., consumption ratios corresponding to RATIO R3-2) (step S126-3). The storing and reading unit 89 then performs a search through the usable amount management DB 8003 (i.e., the usable amount management table T5 in FIG. 5E) by using the group IDs (i.e., GROUP G1 and GROUP G2) read at step S126-2 as a search key, to thereby read 150 (i.e., the usable amount of the group G1) and 200 (i.e., the usable amount of the group G2) as the corresponding usable amounts (step S126-4). If the storing and reading unit 89 reads a plurality of group IDs at step S126-2, the storing and reading unit 89 reads the respective usable amounts corresponding to the plurality of group IDs. The storing and reading unit 89 then performs a search through the consumption amount management DB 8004 (i.e., the consumption amount management table T6 in FIG. 5F) by using the user ID (i.e., USER C) received through the process similar to that of step S22 of the first embodiment as a search key, to thereby read MONOCHROME SIMPLEX PRINTING=2, MONOCHROME DUPLEX PRINTING=3, COLOR SIMPLEX PRINTING=6, COLOR DUPLEX PRINTING=9 as the corresponding consumption amount parameter (step S126-5). Then, the procedure proceeds to the process of step S127. If the determining unit 82 determines at step S126-1 that the authentication result does not include the information indicating that the user ID is valid, i.e., if the determining unit 82 determines a login failure (NO at step S126-1), the procedure also proceeds to the process of step S127.

Referring back to FIG. 14, the transmitting and receiving unit 81 of the usable amount management server 8 transmits the authentication result to the image forming apparatus 4 (step S127). If the determining unit 82 determines at step S126-1 that the authentication result includes the information indicating that the user ID is valid, the authentication result includes the information of validity of the user ID received through a process similar to that of step S25 of the first embodiment, the group IDs (i.e., GROUP G1 and GROUP G2) read at step S126-2, the consumption ratio IDs (i.e., RATIO R3-1 and RATIO R3-2) read at step S126-3, the consumption ratios (i.e., GROUP G1=1 and GROUP G2=0 corresponding to RATIO R3-1 and GROUP G1=0.6 and GROUP G2=0.4 corresponding to RATIO R3-2) read at step S126-3, the usable amounts (i.e., 150 as the usable amount of the group G1 and 200 as the usable amount of the group G2) read at step S126-4, and the consumption amount parameter (i.e., MONOCHROME SIMPLEX PRINTING=2, MONOCHROME DUPLEX PRINTING=3, COLOR SIMPLEX PRINTING=6, COLOR DUPLEX PRINTING=9) read at step S126-5. Thereby, the transmitting and receiving unit 41 of the image forming apparatus 4 receives the authentication result with the information indicating that the user ID is valid. Then, the image forming apparatus 4 sets the logged-in user (i.e., the user C in this example) as the user who is to execute printing, and proceeds to the process of step S128. If the determining unit 82 determines at step S126-1 that the authentication result does not include the information indicating that the user ID is valid, the authentication result includes the information indicating that the user ID is invalid. Thereby, the transmitting and receiving unit 41 of the image forming apparatus 4 receives the authentication result with the information indicating that the user ID is invalid. Then, the display control unit 44 displays an error screen on the display 440a. The following description will be given of processes performed when the user ID is valid.

In the image forming apparatus 4, the storing and reading unit 49 stores and manages the consumption amount parameter received at step S127 in the storing unit 4000 (step S128).

Then, in the image forming apparatus 4, the storing and reading unit 49 stores and manages the group IDs (i.e., GROUP G1 and GROUP G2) and the corresponding usable amounts (i.e., 150 as the usable amount of the group G1 and 200 as the usable amount of the group G2) received at step S127 in the working usable amount management DB 4001 (i.e., the working usable amount management table T1 in FIG. 5A) such that the group IDs and the usable amounts are associated with each other (step S129).

Then, based on the group IDs (i.e., GROUP G1 and GROUP G2) and the consumption ratios (i.e., GROUP G1=1 and GROUP G2=0 corresponding to RATIO R3-1 and GROUP G1=0.6 and GROUP G2=0.4 corresponding to RATIO R3-2) received at step S127, the creating unit 46 of the image forming apparatus 4 creates, for each of the consumption ratio IDs RATIO R3-1 and RATIO R3-2, screen data for displaying a screen that displays the respective consumption ratios of the groups and receives user-set consumption ratios desired by the user C (step S130).

Then, based on the screen data created at step S130, the display control unit 44 displays, on the display 440a, a consumption ratio setting screen 444 illustrated in FIG. 16A (step S131). The consumption ratio setting screen 444 illustrated in FIG. 16A displays, for each of the groups, a consumption ratio 445 that expresses, in percentage, the corresponding consumption ratio received at step S127 (i.e., GROUP G1=1 or GROUP G2=0 corresponding to RATIO R3-1 or GROUP G1=0.6 or GROUP G2=0.4 corresponding to RATIO R3-2). The consumption ratio setting screen 444 also displays buttons 446 for receiving selection of the consumption ratio 445. The user C presses the buttons 446 to select the consumption ratio 445. FIG. 16B illustrates the consumption ratio setting screen 444 displayed after setting, specifically after the user C selects 60 and 40 as the respective consumption ratios of the group G1 and the group G2 by pressing the buttons 446 on the consumption ratio setting screen 444 illustrated in FIG. 16A. When the user C presses the buttons 446 and then an OK button 447, the receiving unit 42 of the image forming apparatus 4 receives the user-set consumption ratios (step S132). In selection of the consumption ratios, which is an example of setting of the consumption ratios, a user selects desired consumption ratios from plural patterns of consumption ratios previously set by the administrator.

Then, the storing and reading unit 49 of the image forming apparatus 4 stores and manages the user-set consumption ratios (i.e., GROUP G1=0.6 and GROUP G2=0.4) received at step S132 in the storing unit 4000 (step S133).

The transmitting and receiving unit 41 of the image forming apparatus 4 then transmits, to the usable amount management server 8, the user ID (i.e., USER C) acquired through a process similar to that of step S21 of the first embodiment and the consumption ratio ID (i.e., RATIO R3-2) for the user-set consumption ratios received at step S132 (step S134). Thereby, the transmitting and receiving unit 81 of the usable amount management server 8 receives the user ID (i.e., USER C) and the consumption ratio ID (i.e., RATIO R3-2) corresponding to the user-set consumption ratios.

Then, the storing and reading unit 89 of the usable amount management server 8 stores and manages the user ID (i.e., USER C) and the consumption ratio ID (i.e., RATIO R3-2) for the user-set consumption ratios received at step S134 in the storing unit 8000 such that the user ID and the consumption ratio ID are associated with each other (step S135).

A process of managing the usable amounts based on the user-set consumption ratios received at step S132 will now be described with FIG. 17, which is a flowchart illustrating a process of calculating the consumption amounts. The usable amount management process of the third embodiment includes processes similar to those of steps S41 to S50, S52, and S49-1 to S49-11 of the first embodiment, and thus description of those processes will be omitted. In the following, step S151 different in process from step S51 of the first embodiment will be described in detail with FIG. 17. The processes of steps S151-1 to S151-4 of the third embodiment, however, are similar to those of steps S51-1 to S51-4 of the first embodiment, and thus description thereof will be omitted.

As illustrated in FIG. 17, the storing and reading unit 89 of the usable amount management server 8 performs a search through the storing unit 8000 by using the user ID (i.e., USER C) received through a process similar to that of step S50 of the first embodiment as a search key, to thereby read the corresponding consumption ratio ID (i.e., RATIO R3-2) stored and managed at step S135 (step S151-5a).

The storing and reading unit 89 of the usable amount management server 8 then performs a search through the consumption ratio management DB 8005 by using the consumption ratio ID (i.e., RATIO R3-2) read at step S151-5a as a search key, to thereby read the corresponding consumption ratios (i.e., GROUP G1=0.6 and GROUP G2=0.4) (step S151-5b).

Then, based on the total consumption amount of 6 calculated through a process similar to that of step S51-3 of the first embodiment and the consumption ratios (i.e., GROUP G1=0.6 and GROUP G2=0.4) read at step S151-5b, the calculating unit 83 of the usable amount management server 8 calculates the respective consumption amounts of the groups (i.e., GROUP G1=3.6 and GROUP G2=2.4) (step S151-6). Then, the procedure proceeds to a process similar to that of step S52 of the first embodiment. Specifically, the calculating unit 83 multiplies the respective consumption ratios of the groups (i.e., GROUP G1=0.6 and GROUP G2=0.4) by the total consumption amount of 6 to calculate the respective consumption amounts of the groups (i.e., GROUP G1=3.6 and GROUP G2=2.4).

As described above, according to the third embodiment, it is possible to flexibly allocate the consumption amounts similarly as in the first embodiment.

Further, at step S131, the display control unit 44 of the image forming apparatus 4 displays the consumption ratio setting screen 444 on the display 440a based on the screen data. The consumption ratio setting screen 444 displays the consumption ratio 445 for each of the groups and the buttons 446 for receiving the selection of the consumption ratio 445, as illustrated in FIGS. 16A and 16B. Thereby, the user C belonging to the plurality of groups is capable of selecting the consumption ratio 445 by pressing the buttons 446, and thus capable of flexibly allocating the consumption amounts to the groups even if the contribution ratios of the user C to the groups vary depending on the print content. Further, the user C is capable of selecting, as desired, the consumption ratios of the groups to which the user C belongs, without intermediation by the administrator. Furthermore, the user C selects the consumption ratios from the options of consumption ratios previously set by the administrator. It is therefore possible to prevent the user C from setting consumption ratios unexpected by the administrator.

Further, similarly as in the first embodiment, the image forming apparatus 4 is capable of performing the usable amount management with no need to inquire of the usable amount management server 8 about whether printing is executable in each printing operation.

A fourth embodiment of the present invention will now be described with FIGS. 18A to 22.

Figure 18A:
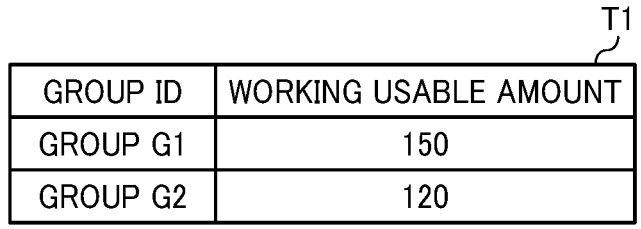
FIG. 18A is a conceptual diagram illustrating a working usable amount management table according to a fourth embodiment of the present invention.
Figure 18B:
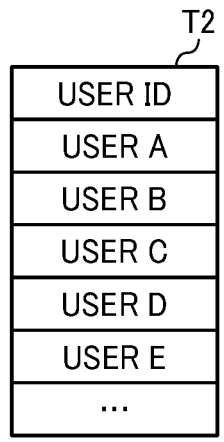
FIG. 18B is a conceptual diagram illustrating a user management table according to the fourth embodiment.
Figure 18C:
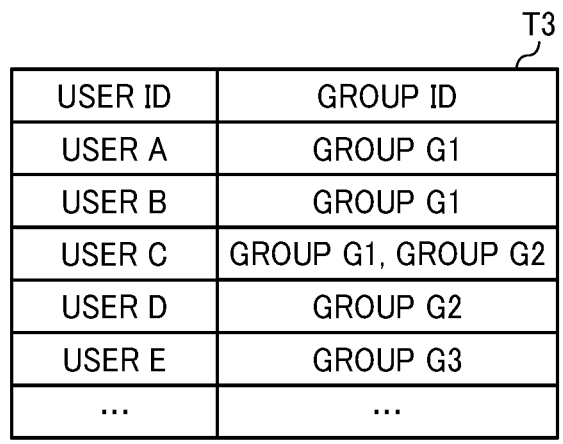
FIG. 18C is a conceptual diagram illustrating a group management table according to the fourth embodiment.
Figure 19:
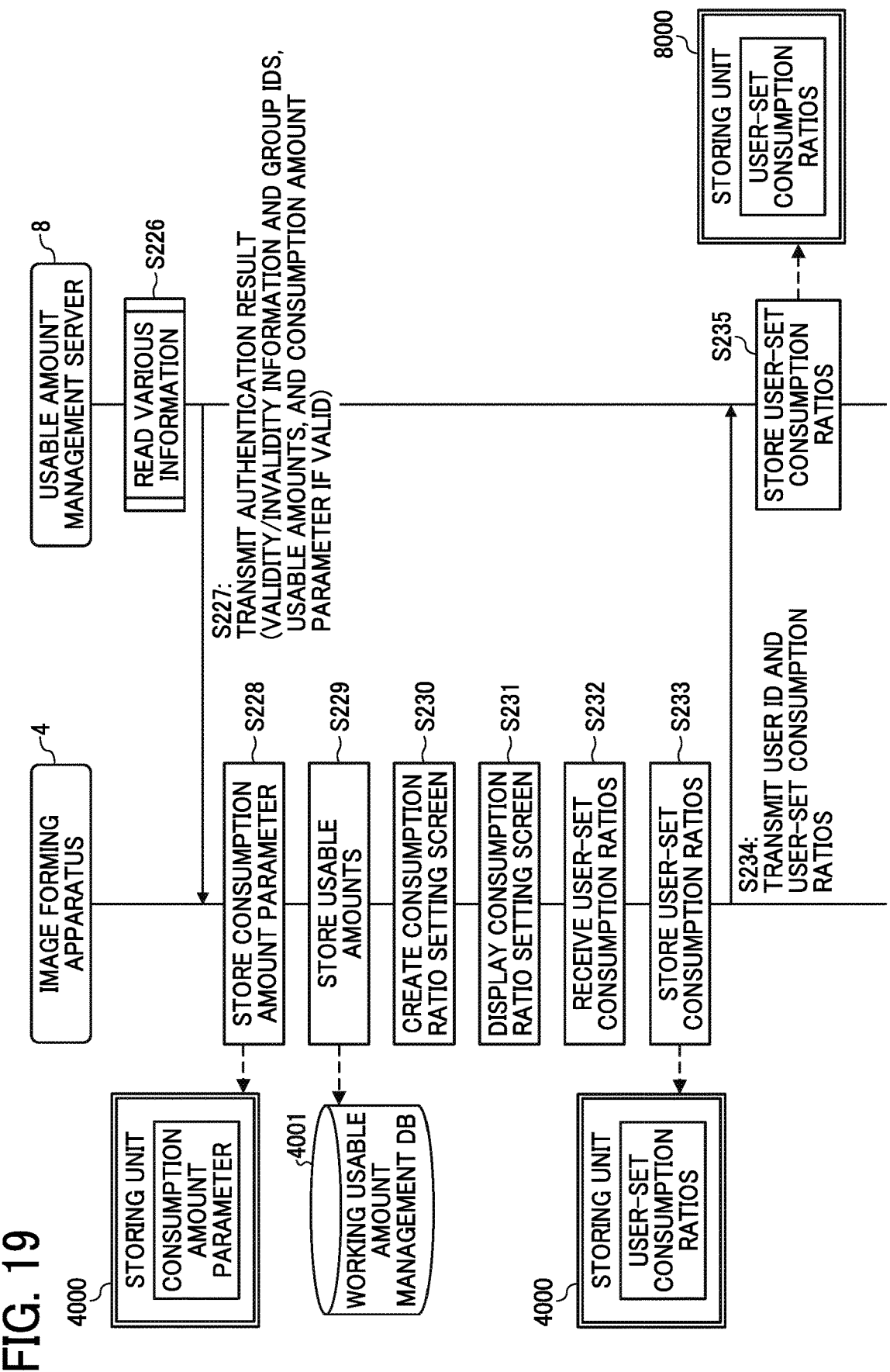
FIG. 19 is a sequence diagram illustrating a process of setting the consumption ratios according to the fourth embodiment.
Figure 20:
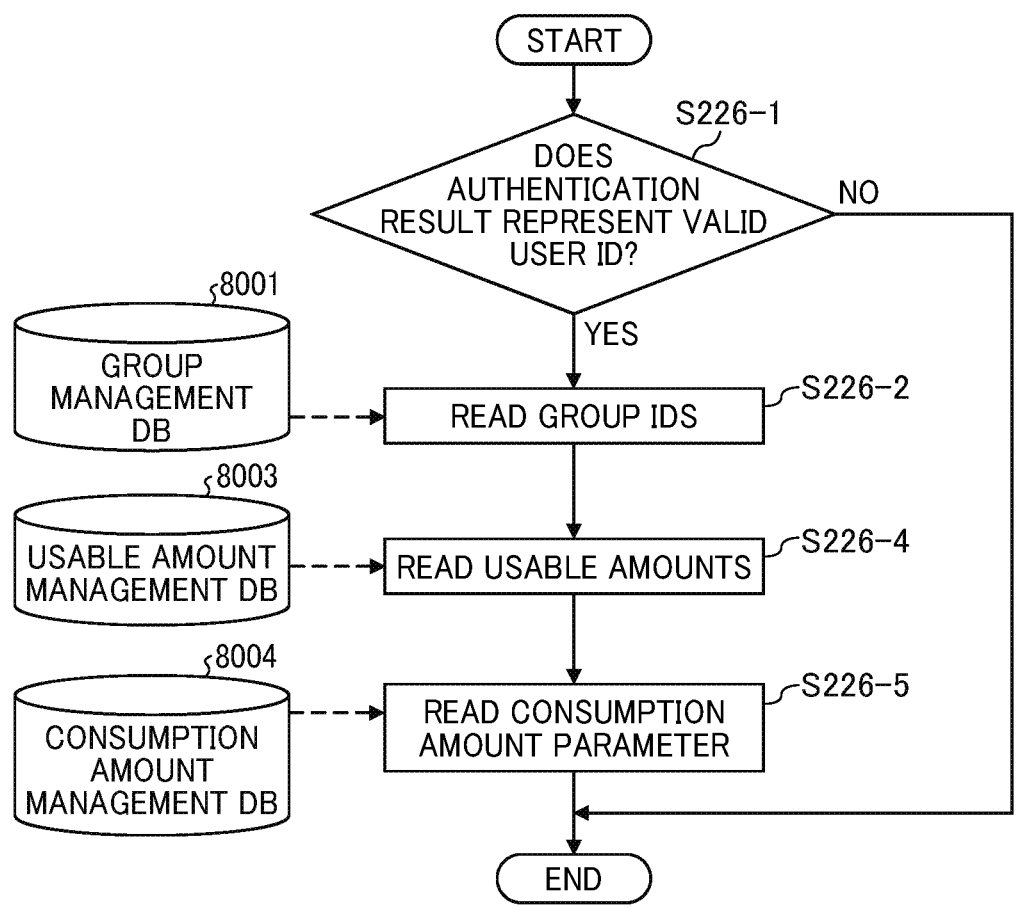
FIG. 20 is a flowchart illustrating a process of reading a variety of information for setting the consumption ratios according to the fourth embodiment.
Figure 21A:
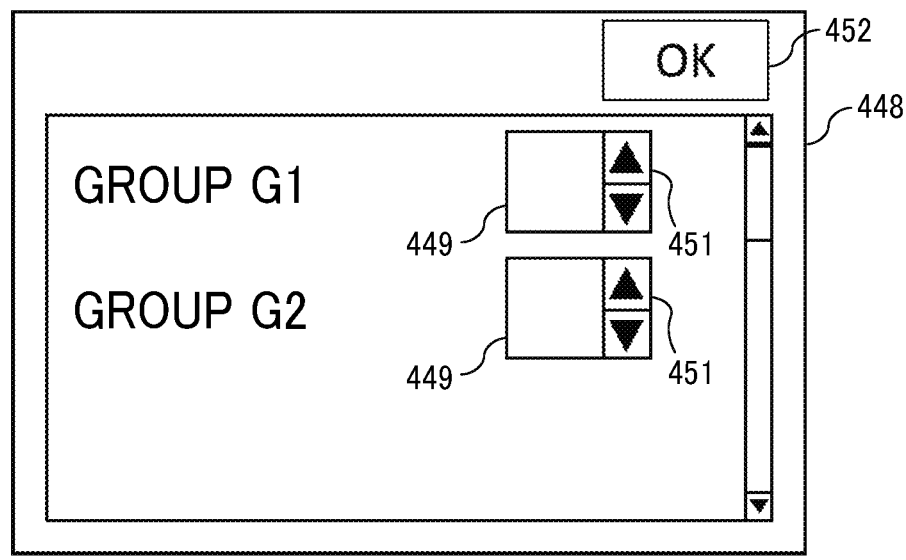
FIGS. 21A and 21B are diagrams illustrating an exemplary screen displayed on the display of the image forming apparatus according to the fourth embodiment.
Figure 21B:
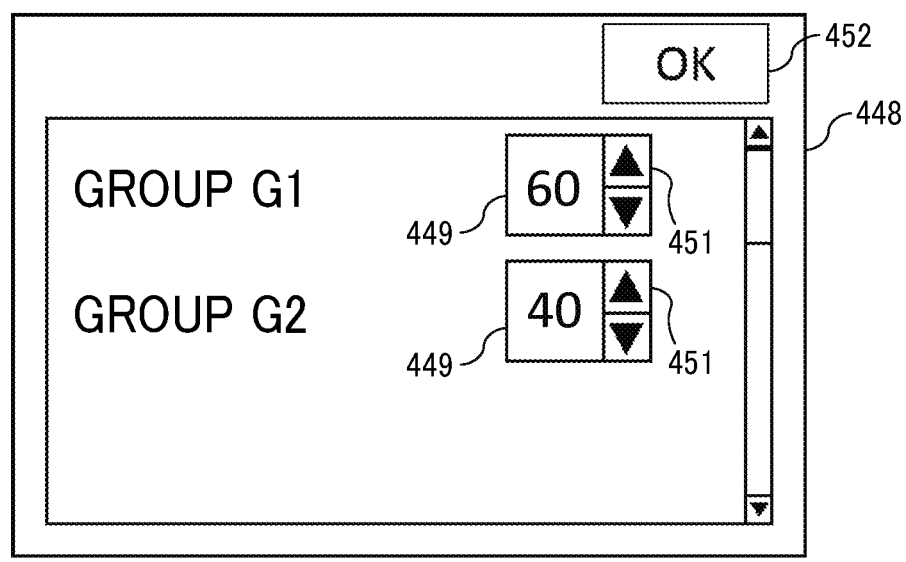
Figure 22:
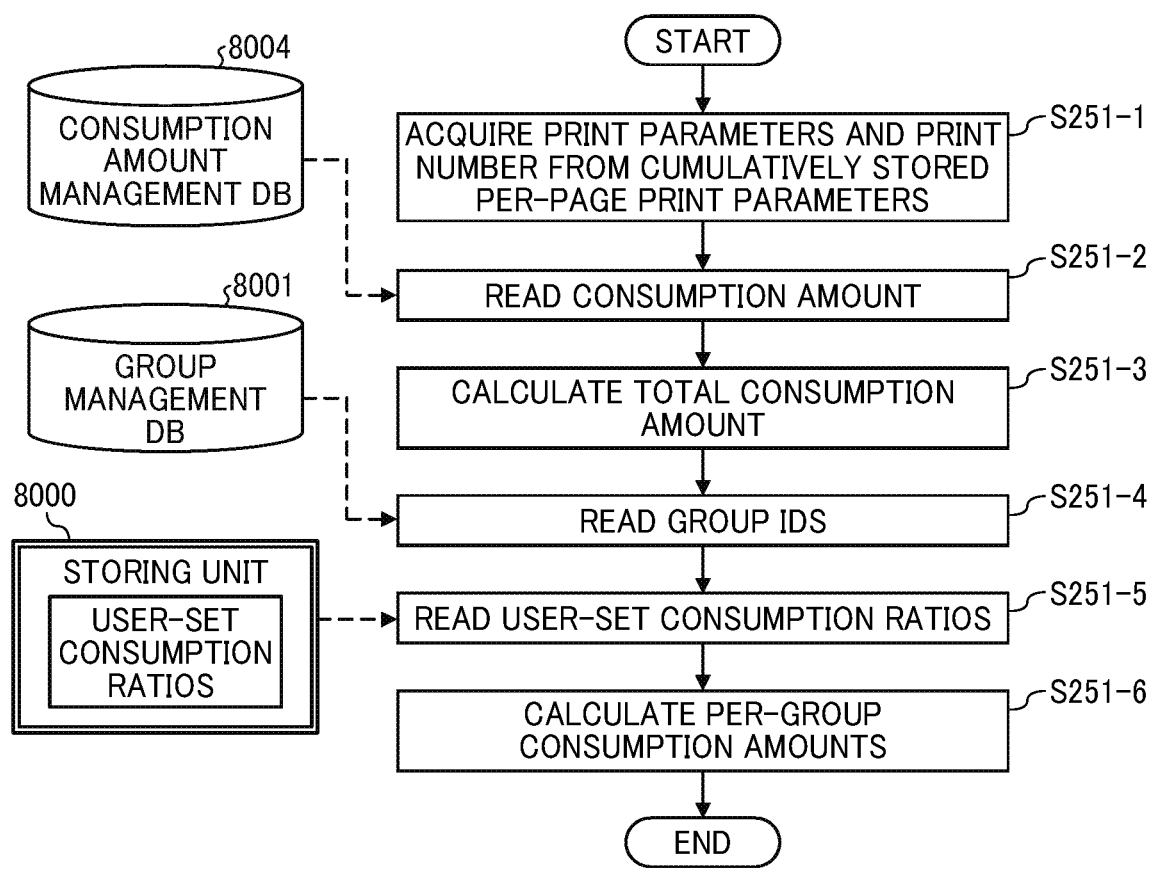
FIG. 22 is a flowchart illustrating a process of calculating the consumption amounts according to the fourth embodiment.

FIG. 18A is a conceptual diagram illustrating a working usable amount management table. FIG. 18B is a conceptual diagram illustrating a user management table. FIG. 18C is a conceptual diagram illustrating a group management table. FIG. 18D is a conceptual diagram illustrating a usable amount management table. FIG. 18E is a conceptual diagram illustrating a consumption amount management table. FIG. 19 is a sequence diagram illustrating a process of setting the consumption ratios. FIG. 20 is a flowchart illustrating a process of reading a variety of information for setting the consumption ratios. FIGS. 21A and 21B are diagrams illustrating an exemplary screen displayed on the display 440a of the image forming apparatus 4. FIG. 22 is a flowchart illustrating a process of calculating the consumption amounts. Terminals, an apparatus, and servers of the fourth embodiment are similar in hardware configuration to those of the first embodiment, and thus description thereof will be omitted.

The administrator terminal 2, the individual terminal 3, the image forming apparatus 4, the authentication management server 6, and the print server 9 of the usable amount managing system 10 in the fourth embodiment are similar in functional configuration to those of the first embodiment, and thus description thereof will be omitted. Further, as illustrated in FIGS. 18C to 18E, the usable amount management server 8 of the fourth embodiment is similar in functional configuration to that of the first embodiment except for the absence of the consumption ratio management DB 8002 of the first embodiment configured as the consumption ratio management table T4 illustrated in FIG. 5D. Thus, description of similarities in functional configuration of the fourth embodiment to the first embodiment will be omitted.

Processes or operations of the fourth embodiment will be described below.

It is assumed here that the user C belonging to both the group G1 and the group G2 may make a print of print content related only to business of the group G1 or may make a print of print content related to business covered by both the group G1 and the group G2. That is, the contribution ratio of the user C to the group G1 and the contribution ratio of the user C to the group G2 vary depending on which of the two types of print content is printed. It is also assumed that, when the user C makes a print of print content related only to business of the group G1, the user C desires the consumption ratio of the group G1 and the consumption ratio of the group G2 to be set as 100% and 0%, respectively, to be used in the management of the usable amounts. It is further assumed that, when the user C makes a print of print content related to business covered by both the group G1 and the group G2, the user C desires the consumption ratio of the group G1 and the consumption ratio of the group G2 to be set as 60% and 40%, respectively, to be used in the management of the usable amounts. The following description will be given of processes or operations performed in this case when the user C makes a print of print content related to business covered by both the group G1 and the group G2, and desires the consumption ratios to be changed to 60% for the group G1 and 40% for the group G2 to be used in the management of the usable amounts.

The setting of the consumption ratios performed on the image forming apparatus 4 by the user C will first be described with FIGS. 19 to 21B.

FIG. 19 is a sequence diagram illustrating a process of setting the consumption ratios. FIG. 20 is a flowchart illustrating a process of reading a variety of information for setting the consumption ratios. FIGS. 21A and 21B are diagrams illustrating an exemplary screen displayed on the display 440*a* of the image forming apparatus 4. The consumption ratio setting process of the fourth embodiment includes processes similar to those of steps S21 to S25 of the first embodiment, and thus description of those processes will be omitted.

FIG. 19 illustrates steps following a step similar in process to step S25. As illustrated in FIG. 19, the usable amount management server 8 performs a process of reading a variety of information for setting the consumption ratios based on the authentication result (step S226).

The process of step S226 will now be described in detail with FIG. 20, which is a flowchart illustrating a process of reading a variety of information for setting the consumption ratios.

As illustrated in FIG. 20, the determining unit 82 of the usable amount management server 8 determines whether the authentication result received at the step similar to step S25 includes the information indicating that the IC card is valid, i.e., whether the user ID acquired through a process similar to that of step S21 of the first embodiment is valid (step S226-1). If the determining unit 82 determines at step S226-1 that the authentication result includes the information indicating that the user ID is valid, i.e., if the determining unit 82 determines a login success (YES at step S226-1), the storing and reading unit 89 performs a search through the group management DB 8001 (i.e., the group management table T3 in FIG. 18C) by using the user ID (i.e., USER C) received through a process similar to that of step S22 of the first embodiment as a search key, to thereby read GROUP G1 and GROUP G2 as the corresponding group Ds (step S226-2). The storing and reading unit 89 then performs a search through the usable amount management DB 8003 (i.e., the usable amount management table T5 in FIG. 18D) by using the group IDs (i.e., GROUP G1 and GROUP G2) read at step S226-2 as a search key, to thereby read 150 (i.e., the usable amount of the group G1) and 200 (i.e., the usable amount of the group G2) as the corresponding usable amounts (step S226-4). If the storing and reading unit 89 reads a plurality of group IDs at step S226-2, the storing and reading unit 89 reads the respective usable amounts corresponding to the plurality of group IDs. The storing and reading unit 89 then performs a search through the consumption amount management DB 8004 (i.e., the consumption amount management table T6 in FIG. 18E) by using the user ID (i.e., USER C) received through the process similar to that of step S22 of the first embodiment as a search key, to thereby read MONOCHROME SIMPLEX PRINTING=2, MONOCHROME DUPLEX PRINTING=3, COLOR SIMPLEX PRINTING=6, COLOR DUPLEX PRINTING=9 as the corresponding consumption amount parameter (step S226-5). Then, the procedure proceeds to the process of step S227. If the determining unit 82 determines at step S226-1 that the authentication result does not include the information indicating that the user ID is valid, i.e., if the determining unit 82 determines a login failure (NO at step S226-1), the procedure also proceeds to the process of step S227.

Referring back to FIG. 19, the transmitting and receiving unit 81 of the usable amount management server 8 transmits the authentication result to the image forming apparatus 4 (step S227). If the determining unit 82 determines at step S226-1 that the authentication result includes the information indicating that the user ID is valid, the authentication result includes the information of validity of the user ID received through a process similar to that of step S25 of the first embodiment, the group IDs (i.e., GROUP G1 and GROUP G2) read at step S226-2, the usable amounts (i.e., 150 as the usable amount of the group G1 and 200 as the usable amount of the group G2) read at step S226-4, and the consumption amount parameter (i.e., MONOCHROME SIMPLEX PRINTING=2, MONOCHROME DUPLEX PRINTING=3, COLOR SIMPLEX PRINTING=6, COLOR DUPLEX PRINTING=9) read at step S226-5. Thereby, the transmitting and receiving unit 41 of the image forming apparatus 4 receives the authentication result with the information indicating that the user ID is valid. Then, the image forming apparatus 4 sets the logged-in user (i.e., the user C in this example) as the user who is to execute printing, and proceeds to the process of step S228. If the determining unit 82 determines at step S226-1 that the authentication result does not include the information indicating that the user ID is valid, the authentication result includes the information indicating that the user ID is invalid. Thereby, the transmitting and receiving unit 41 of the image forming apparatus 4 receives the authentication result with the information indicating that the user ID is invalid. Then, the display control unit 44 displays an error screen on the display 440*a*. The following description will be given of processes performed when the user ID is valid.

In the image forming apparatus 4, the storing and reading unit 49 stores and manages the consumption amount parameter received at step S227 in the storing unit 4000 (step S228).

Then, in the image forming apparatus 4, the storing and reading unit 49 stores and manages the group IDs (i.e., GROUP G1 and GROUP G2) and the corresponding usable amounts (i.e., 150 as the usable amount of the group G1 and 200 as the usable amount of the group G2) received at step S227 in the working usable amount management DB 4001 (i.e., the working usable amount management table T1 in FIG. 18A) such that the group IDs and the usable amounts are associated with each other (step S229).

Then, based on the group IDs (i.e., GROUP G1 and GROUP G2) received at step S227, the creating unit 46 of the image forming apparatus 4 creates screen data for displaying a screen that displays the groups and receives user-set consumption ratios desired by the user C (step S230).

Then, based on the screen data created at step S230, the display control unit 44 displays, on the display 440*a*, a consumption ratio setting screen 448 illustrated in FIG. 21A (step S231). The consumption ratio setting screen 448 illustrated in FIG. 21A displays the groups corresponding to the group IDs (i.e., GROUP G1 and GROUP G2) received at step S227 and buttons 451 for receiving a change in the consumption ratios. The user C presses the buttons 451 to change the consumption ratios displayed in fields 449. FIG. 21B illustrates the consumption ratio setting screen 448 displayed after setting, specifically after the user C changes the respective consumption ratios of the group G1 and the group G2 to 60 and 40 by pressing the buttons 451 on the consumption ratio setting screen 448 illustrated in FIG. 21A. When the user C presses an OK button 452, the receiving unit 42 of the image forming apparatus 4 receives the user-set consumption ratios (step S232).

Then, the storing and reading unit 49 of the image forming apparatus 4 stores and manages the user-set consumption ratios (i.e., GROUP G1=0.6 and GROUP G2=0.4) received at step S232 in the storing unit 4000 (step S233).

The transmitting and receiving unit 41 of the image forming apparatus 4 then transmits, to the usable amount management server 8, the user ID (i.e., USER C) acquired through a process similar to that of step S21 of the first embodiment and the user-set consumption ratios (i.e., GROUP G1=0.6 and GROUP G2=0.4) received at step S232 (step S234). Thereby, the transmitting and receiving unit 81 of the usable amount management server 8 receives the user ID (i.e., USER C) and the user-set consumption ratios (i.e., GROUP G1=0.6 and GROUP G2=0.4).

Then, the storing and reading unit 89 of the usable amount management server 8 stores and manages the user ID (i.e., USER C) and the user-set consumption ratios (i.e., GROUP G1=0.6 and GROUP G2=0.4) received at step S234 in the storing unit 8000 such that the user ID and the user-set consumption ratios are associated with each other (step S235).

A process of managing the usable amounts based on the user-set consumption ratios received at step S232 will now be described with FIG. 22, which is a flowchart illustrating a process of calculating the consumption amounts. The usable amount management process of the fourth embodiment includes processes similar to those of steps S41 to S50, S52, and S49-1 to S49-11 of the first embodiment, and thus description of those processes will be omitted. In the following, step S251 different in process from step S51 of the first embodiment will be described in detail with FIG. 22. The processes of steps S251-1 to S251-4 of the fourth embodiment, however, are similar to those of steps S51-1 to S51-4 of the first embodiment, and thus description thereof will be omitted.

As illustrated in FIG. 22, the storing and reading unit 89 of the usable amount management server 8 performs a search through the storing unit 8000 by using the user ID (i.e., USER C) received through a process similar to that of step S50 of the first embodiment as a search key, to thereby read the corresponding user-set consumption ratios (i.e., GROUP G1=0.6 and GROUP G2=0.4) stored and managed at step S235 (step S251-5).

Then, based on the total consumption amount of 6 calculated through a process similar to that of step S51-3 of the first embodiment and the consumption ratios (i.e., GROUP G1=0.6 and GROUP G2=0.4) read at step S251-5, the calculating unit 83 of the usable amount management server 8 calculates the respective consumption amounts of the groups (i.e., GROUP G1=3.6 and GROUP G2=2.4) (step S251-6). Then, the procedure proceeds to a process similar to that of step S52 of the first embodiment. Specifically, the calculating unit 83 multiplies the respective consumption ratios of the groups (i.e., GROUP G1=0.6 and GROUP G2=0.4) by the total consumption amount of 6 to calculate the respective consumption amounts of the groups (i.e., GROUP G1=3.6 and GROUP G2=2.4).

As described above, according to the fourth embodiment, it is possible to flexibly allocate the consumption amounts similarly as in the first embodiment.

Further, similarly as in the first embodiment, the image forming apparatus 4 is capable of performing the usable amount management with no need to inquire of the usable amount management server 8 about whether printing is executable in each printing operation.

Each of the component elements of the administrator terminal 2, the individual terminal 3, the authentication management server 6, the usable amount management server 8, or the print server 9 illustrated in FIG. 2, such as the CPU 201, may be singular or plural. Similarly, each of the component elements of the image forming apparatus 4 illustrated in FIG. 3 may be singular or plural.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. In the embodiments, processing circuitry includes a programmed processor, as a processor includes circuitry. A processing circuit also includes devices such as a processor implemented by an electronic circuit, and a device such as an application specific integrated circuit (ASIC), digital signal processor (DSP), field programmable gate array (FPGA), system on a chip (SOC), graphics processing unit (GPU), or conventional circuit module arranged to perform the recited functions based on software. Further, the above-described steps are not limited to the order disclosed herein.

The invention claimed is:

1. A printing apparatus, comprising:
a printing device;
processing circuitry; and
a memory to store a program which, when executed by the processing circuitry, causes the processing circuitry to:
transmit user identification information identifying a user, the user identification information being received at a usable amount management server that manages a usable amount for each entity to which the user belongs, the usable amount being reduced by printing;
in response to transmission of the user identification information, receive entity identification information corresponding to the user identification information, the entity identification information identifying a particular entity to which the user belongs; and
when the processing circuitry determines, from the received entity identification information, that the user belongs to a plurality of entities, control a display to display a screen according to the received entity identification information to receive setting of a consumption ratio, the consumption ratio representing a ratio of a consumption amount to be allocated to each of the plurality of entities to which the user belongs to a consumption amount consumed by printing by the user, wherein the processing circuitry is further configured to
calculate the consumption amount of the each of the plurality of entities based on the set consumption ratio,
in response to the transmission of the user identification information, receive usable amount information corresponding to the entity identification information, the usable amount information representing the usable amount of the each of the plurality of entities to which the user belongs,
determine whether the consumption amount of the each of the plurality of entities is greater than the usable amount of the each of the plurality of entities, and
when it is determined that the consumption amount of the each of the plurality of entities is equal to or less than the usable amount of the each of the plurality of entities, instruct the printing device to start printing.

2. The printing apparatus of claim 1, wherein in response to the transmission of the user identification information, the processing circuitry is further configured to receive consumption ratio information corresponding to the user identification information, the consumption ratio information representing the consumption ratio, and wherein the screen to receive the setting of the consumption ratio displays the consumption ratio of the each of the plurality of entities based on the attribute identification information and the consumption ratio information.

3. The printing apparatus of claim 1, wherein the processing circuitry is further configured to receive the setting of the consumption ratio according to a user operation.

4. The printing apparatus of claim 1, wherein the setting of the consumption ratio received by the processing circuitry changes the consumption ratio.

5. The printing apparatus of claim 1, wherein the setting of the consumption ratio received by the processing circuitry is a selection of the consumption ratio.

6. A usable amount managing system, comprising:
the printing apparatus of claim 1; and
the usable amount management server configured to manage the usable amount for each entity to which the user belongs.

7. The usable amount managing system of claim 6, wherein the usable amount management server includes
a server memory configured to store the user identification information, the entity identification information, and the consumption ratio information in association with each other, and
one or more processors, the one or more processors being configured to
receive the user identification information transmitted by the printing apparatus,
in response to reception of the user identification information, read from the server memory, the entity identification information and the consumption ratio information that correspond to the user identification information, and
transmit the read entity identification information and the consumption ratio information to the printing apparatus.

8. A usable amount managing method, comprising:
transmitting user identification information identifying a user, the user identification information being received at a usable amount management server that manages a usable amount for each entity to which the user belongs, the usable amount being reduced by printing;
in response to transmission of the user identification information, receiving entity identification information corresponding to the user identification information, the entity identification information identifying a particular entity to which the user belongs;
when determining, from the received entity identification information, that the user belongs to a plurality of entities, displaying, on a display, a screen according to the received entity identification information to receive setting of a consumption ratio, the consumption ratio representing a ratio of a consumption amount to be allocated to each of the plurality of entities to which the user belongs to a consumption amount consumed by printing executed by the user;
calculating the consumption amount of the each of the plurality of entities based on the set consumption ratio;
in response to the transmission of the user identification information, receiving usable amount information corresponding to the entity identification information, the usable amount information representing the usable amount of the each of the plurality of entities to which the user belongs,
determining whether the consumption amount of the each of the plurality of entities is greater than the usable amount of the each of the plurality of entities, and
when it is determined that the consumption amount of the each of the plurality of entities is equal to or less than the usable amount of the each of the plurality of entities, instructing the printing device to start printing.

9. A non-transitory recording medium storing a plurality of instructions which, when executed by one or more processors, cause the processors to perform a usable amount managing method comprising:
transmitting user identification information identifying a user, the user identification information being received at a usable amount management server that manages a usable amount for each entity to which the user belongs, the usable amount being reduced by printing;
in response to transmission of the user identification information, receiving entity identification information corresponding to the user identification information, the entity identification information identifying a particular entity to which the user belongs;
when determining, from the received entity identification information, that the user belongs to a plurality of entities, displaying, on a display, a screen according to the received entity identification information to receive setting of a consumption ratio, the consumption ratio representing a ratio of a consumption amount to be allocated to each of the plurality of entities to which the user belongs to a consumption amount consumed by printing executed by the user;
calculating the consumption amount of the each of the plurality of entities based on the set consumption ratio;
in response to the transmission of the user identification information, receiving usable amount information corresponding to the entity identification information, the usable amount information representing the usable amount of the each of the plurality of entities to which the user belongs,
determining whether the consumption amount of the each of the plurality of entities is greater than the usable amount of the each of the plurality of entities, and
when it is determined that the consumption amount of the each of the plurality of entities is equal to or less than the usable amount of the each of the plurality of entities, instructing the printing device to start printing.

10. The printing apparatus of claim 1, wherein the processing circuitry is further configured to receive the entity identification information, which identifies all the entities to which the user belongs, each of the entities being one of a group, a company, a department, a team, and a region.

* * * * *